United States Patent
Eidelson et al.

(10) Patent No.: US 8,780,703 B1
(45) Date of Patent: Jul. 15, 2014

(54) FALLBACK MESSAGING

(71) Applicant: Google Inc., Mountain View, CA (US)

(72) Inventors: Benjamin David Eidelson, San Francisco, CA (US); Jagjit Singh Chawla, Bangalore (IN); Jason Prado, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/778,308

(22) Filed: Feb. 27, 2013

Related U.S. Application Data

(63) Continuation of application No. 13/368,258, filed on Feb. 7, 2012, now Pat. No. 8,391,136.

(60) Provisional application No. 61/591,803, filed on Jan. 27, 2012.

(51) Int. Cl.
| | |
|---|---|
| *H04L 12/26* | (2006.01) |
| *H04L 12/58* | (2006.01) |
| *H04W 4/14* | (2009.01) |

(52) U.S. Cl.
CPC ............. *H04L 51/32* (2013.01); *H04L 51/38* (2013.01); *H04W 4/14* (2013.01)
USPC ........................................... 370/228

(58) Field of Classification Search
CPC ..... H04L 51/32; H04L 51/38; H04L 61/1564; H04L 12/58; H04W 4/12; H04W 4/14; H04M 1/72552; H04M 7/0048
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,658,454 B1 * | 12/2003 | Delany et al. ................. | 709/202 |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,295,657 B1 | 11/2007 | Keohane et al. | |

(Continued)

FOREIGN PATENT DOCUMENTS

WO          02079984          10/2002

OTHER PUBLICATIONS

Adamic et al., "A Social Network Caught in the Web," Internet Journal, First Monday, Jun. 2, 2003, pp. 1-22, vol. 8, No. 6.

(Continued)

*Primary Examiner* — Min Jung
(74) *Attorney, Agent, or Firm* — Troutman Sanders LLP; James E. Schutz; Christopher W. Glass

(57) ABSTRACT

A computing device may receive first message data associated with a messaging group. The computing device may associate the first message data with a messaging thread. The computing device may associate a unique session identifier with one or both of the messaging thread and the messaging group. For a first one or more user devices of the messaging group, the computing device may send the message data along with the unique identifier via a native messaging protocol. For a second one or more of the user devices of the messaging group, the computing device may associate a fallback identifier of each of the one or more second user devices with one or both of the messaging thread and the messaging group, and send the first message data and unique identifier via a fallback messaging protocol.

23 Claims, 9 Drawing Sheets

(56) References Cited

U.S. PATENT DOCUMENTS

| | | | |
|---|---|---|---|
| 7,366,990 | B2 | 4/2008 | Pitroda |
| 7,555,110 | B2 | 6/2009 | Dolan et al. |
| 7,610,287 | B1 | 10/2009 | Dean et al. |
| 7,623,848 | B2 | 11/2009 | Rosenfelt et al. |
| 7,742,468 | B2 | 6/2010 | Vagelos |
| 7,778,976 | B2 | 8/2010 | D'Souza et al. |
| 7,802,010 | B1 | 9/2010 | Oehrke |
| 7,912,189 | B2 | 3/2011 | Srivastava et al. |
| 8,122,144 | B2 | 2/2012 | Borgendale et al. |
| 8,139,563 | B2 | 3/2012 | Jackson et al. |
| 8,141,140 | B2 | 3/2012 | Wenzel et al. |
| 8,391,136 | B1 | 3/2013 | Eidelson et al. |
| 2002/0137490 | A1 | 9/2002 | Gallant |
| 2002/0143874 | A1 | 10/2002 | Marquette et al. |
| 2004/0258220 | A1 | 12/2004 | Levine et al. |
| 2005/0152521 | A1 | 7/2005 | Liljestrand |
| 2006/0026288 | A1 | 2/2006 | Acharya et al. |
| 2006/0077957 | A1 | 4/2006 | Reddy et al. |
| 2006/0206604 | A1 | 9/2006 | O'Neil et al. |
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |
| 2008/0056475 | A1 | 3/2008 | Brannick et al. |
| 2008/0192656 | A1 | 8/2008 | Vagelos |
| 2010/0093381 | A1 | 4/2010 | Maguire |
| 2010/0220585 | A1 | 9/2010 | Poulson et al. |
| 2011/0070900 | A1 | 3/2011 | Shi et al. |
| 2011/0098156 | A1 | 4/2011 | Ng et al. |
| 2011/0153743 | A1* | 6/2011 | Lindner et al. ............ 709/204 |

OTHER PUBLICATIONS

Agarwal et al., "Enabling Real-Time User Interests for Next Generation Activity-Oriented Social Networks", Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut", University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles", J. Educational Technology Systems, vol. 34, No. 1, 2005-2006, Baywood Publishing Co., Inc., pp. 5-32.

Boyd, et al., "Social Network Sites: Definition, History, and Scholarship", Journal of Computer-Mediated Communication, International Communication Association, 2008, pp. 210-230.

Churchill et al., "Social Networks and Social Networking", IEEE Computer Society, Sep.-Oct. 2005, pp. 14-19.

Cohen et al., "Social Networks for Creative Collaboration", C&C '05, Apr. 12-15, 2005, pp. 252-255, London, United Kingdom.

Decker et al., "The Social Semantic Desktop", Digital Enterprise Research Institute, DERI Galway, Ireland, DERI Innsbruck, Austria, DERI Technical Report, May 2, 2004, 7 pgs.

Different Types of Mobile Messages—Technical Information about SMS Text Messaging Displays, Internet, retrieved at http://www.pangolinsms.com/tech02-types-of-mobile-messages.htm, Sep. 21, 2011, 4 pgs.

Dukes-Schlossberg et al., "Battlefield Awareness and Data Dissemination Intelligent Information Dissemination Server", Air Force Research Laboratory, Rome Research Site, Rome, NY, Nov. 1, 1999, 31 pgs.

Eagle et al., "Social Serendipity: Proximity Sensing and Cueing", MIT Media Laboratory Technical Note 580, May 2004, 18 pgs.

Erickson et al., "Social Translucence: Using Minimalist Visualizations of Social Activity to Support Collective Interaction", Designing Information Spaces: The Social Navigation Approach, Springer-verlag: London, 2003, pp. 1-19.

Gross et al., "Information Revelation and Privacy in Online Social Networks", WPES '05, Alexandria, Virginia, Nov. 7, 2005, pp. 71-80.

Hammond et al., "Social Bookmarking Tools (I)", D-Lib Magazine, Apr. 2005, vol. II, No. 4, ISSN 1082-9873, 23 pgs.

Heer et al., "Vizster: Visualizing Online Social Networks", University of California, Berkeley, 8 pgs.

International Search Report dated Sep. 30, 2008 for PCT Application No. PCT/US2008/005118.

Leonard, "You Are Who You Know", Internet, retrieved at http://www.salon.com, Jun. 15, 2004, 15 pgs.

LiveJournal, "FAQ Question #163: How Do I Find a Syndicated Account?", Last Updated: thebubba, Jan. 6, 2004, 2 pgs.

Marwick, "Selling Your Self: Online Identity in the Age of a Commodified Internet", University of Washington, 2005, 192 pgs.

DataSift: Realtime Social Data Mining Platform, Curate and Data Mine the Real Time Web with DataShift, Dedipower, Managed Hosting, Retrieved on May 13, 2011, p. 1.

Metcalf et al., "Spatial Dynamics of Social Network Evolution", 23rd International Conference of the System Dynamics Society, Jul. 19, 2005, pp. 1-13.

Mori et al., "Real-world Oriented Information Sharing Using Social Networks", Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 11, 2004, 22 pgs.

Nardi et al., "Blogging as Social Activity, or, Would You Let 900 Million People Read Your Diary?", CSCW'04, Nov. 6-10, 2004, vol. 6, Issue 3, Chicago, Illinois, pp. 222-231.

Neumann et al., "Semantic Social Network Portal for Collaborative Online communities", Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Singh et al., "CINEMA: Columbia InterNet Extensible Multimedia Architecture", Department of Computer Science, Columbia University, pp. 1-83.

SMS Gateway, Wikipedia, retrieved at http://en.wikipedia.org/wiki/SMS_gateway, Sep. 21, 2011, 4 pgs.

Steen et al., "Development of We-Centric, Context-Aware, Adaptive Mobile Services Requires Empathy and Dialogue", Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011,8 pgs.

Twitter Blog: TrackingTwitter, Internet, retrieved at http://blog.twitter.com/2007/09/tracking-twitter.html, May 13, 2011, 2 pgs.

"Twitter Announces Fire Hose Marketplace: Up to 10K Keyword Filters for 30 Cents", Internet, Retrieved at http://www.readywriteweb.com/archives/twitter_announces_fire_hose_marketplace_up_to_10k.php, May 13, 2011, 7 pgs.

Van Eijk et al., "We-Centric, Context-Aware, Adaptive Mobile Service Bundles", Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

International Search Report and Written Opinion dated Apr. 9, 2013 for related PCT Patent Application No. PCT/US2013/023443.

\* cited by examiner

FALLBACK MESSAGING

CROSS-REFERENCE TO RELATED APPLICATIONS

This application is a continuation of U.S. patent application Ser. No. 13/368,258 titled "Fallback Messaging" and filed on Feb. 7, 2012 which, in turn, claims priority to U.S. Provisional Patent Application No. 61/591,803 titled "Fallback Messaging" filed on Jan. 27, 2012. Bach of the above-referenced applications is hereby incorporated by reference herein in its entirety

BACKGROUND

The present disclosure relates to electronic communication. In particular, the present disclosure relates to a system and methods for fallback messaging.

The popularity and use of social networks and other types of electronic communication have grown dramatically in recent years. Traditionally users have used social networks to view and comment on each other's social stream, however new features to facilitate communication between members of a social network have been developed. For example, users can use built-in messaging functionality to send each other instant messages.

While users once accessed these social networks exclusively on desktop or laptop computers via the Internet, users are now accessing these social networks on their portable electronic devices, such as smartphones, netbooks and tablets via the Internet However, Internet access from these portable electronic devices can, at times, be unavailable or intermittent and prevent users from receiving or sending messages to one another. For example, due to coverage dead zones, weak connectivity or overloaded cellphone networks, a user may fail to receive a message from another user of the social network.

Current systems and methods have been limited in how they exchange messages when users are unable to reliably access the Internet. For example, when an Internet connection is intermittent or not readily available, a user using these systems and methods might not be able to send or receive messages, or night only be able to send or receive messages when access to the Internet is again available.

SUMMARY

The present disclosure overcomes the deficiencies and limitations of the prior art at least in part by providing a system and associated methods for fallback messaging. In one innovative aspect, the system includes an interface module for sending and receiving message data, a fallback determination module and a dispatcher. The fallback determination module determines the availability of a network data connection of a user device designated by the message data to receive the message data and generates a routing signal based at least in part on the availability of the network data connection. The fallback determination module is coupled to the interface module to receive the message data. The dispatcher dispatches the message data via the network data connection using a native messaging protocol or a fallback data connection using a fallback messaging protocol based at least in part on the routing signal. The dispatcher is coupled to the fallback determination module to receive the routing signal.

In another innovative aspect, a computer-implemented method for fallback messaging includes receiving message data designated for a user of a user device receiving connection information for the user device, determining by a processor whether a network data connection to the user device is available based at least in part on the connection information and dispatching the message data to the user device via a fallback data connection using a fallback messaging protocol if the network data connection is determined to be unavailable.

Other aspects include corresponding systems, methods and apparatus, including computer program products. The systems and methods disclosed below are advantageous in a number of respects. For example, they can deliver messages to a user device even if the user device is unable to couple to a network such as the Internet. They can also maintain a seamless user messaging experience even if messages have been sent via a fallback. However, this summary of features and advantages is not all-inclusive and many additional features and advantages are within the scope of the present disclosure. Moreover, it should be noted that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

Figure 1:
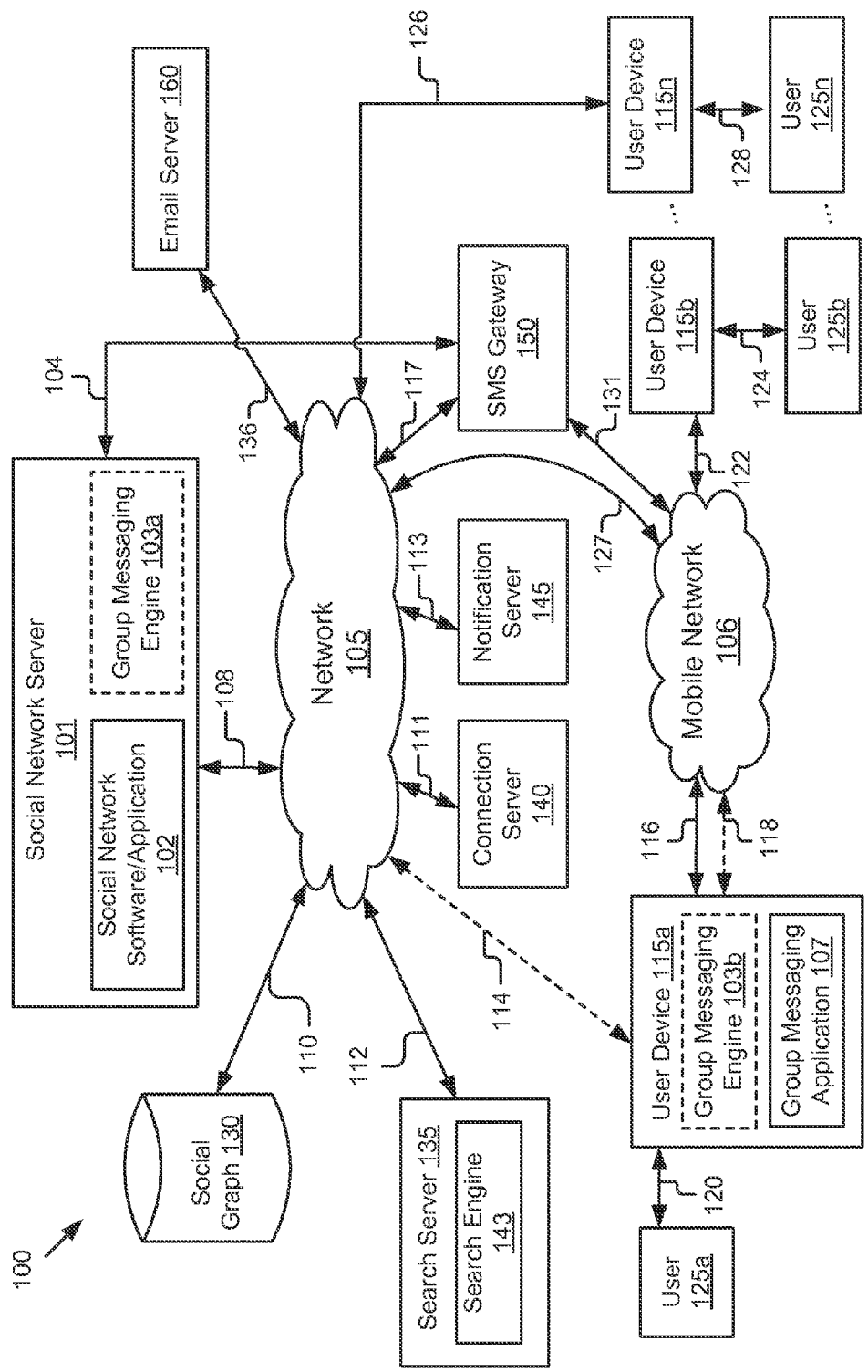
FIG. 1 is a block diagram illustrating a system for fallback messaging according to some embodiments of the present disclosure.

FIG. 1 is a block diagram illustrating a system 100 for fallback messaging according to some embodiments. The architecture of system 100 includes a social network server 101, an work 105, a mobile network 106, user devices 115a, 115b . . . , 115n (also referred to herein individually and collectively as 115) that are accessed by users 125a, 125b . . . 125n (also referred to herein individually and collectively as 125), a social graph 130, a search server 135, a connection server 140, a notification server 145, an SMS gateway 150 and an email server 160. In the illustrated embodiment, the entities 101, 115, 130, 135, 140, 145, 150 and 160 are electronically communicatively coupled via the network 105, the entities 115 and 150 are electronically communicatively coupled via the mobile network 106, and the network 105 and mobile network 106 are coupled for electronic communication via signal line 127. However, the present disclosure is not limited to this configuration and the entities of system 100 may be interconnected via one hybrid network which combines network 105 and mobile network 106, or connected to and/or interconnected by any number of networks 105 and mobile networks 106. While the present disclosure is described above primarily in the context of activities related to messaging via the social network server 101, the present disclosure is applicable to any type of electronic communication between entities of a network.

The social network server 101 is a server for providing a social networking service. In the depicted embodiment, the social network server 101 is coupled to the network 105 via signal line 108. In some embodiments, the social network server 101 includes one or more processors and one or more storage devices storing data or instructions for execution by the one or more processors. For example, the social network server 101 is a server, a server array or any other computing device, or group of computing devices, having data processing, storing and communication capabilities. In other embodiments, the social network server 101 is a virtual server (i.e., a virtual machine) implemented via software. For example, the virtual server operates in a host server environment and accesses the physical hardware of the host server including, for example, a processor, memory, storage, network interfaces, etc., via an abstraction layer (e.g., a virtual machine manager). In some embodiments, the social network server 101 interacts with the other entities 106, 115, 130, 135, 140, 145, 150 and 160 of the system 100 via the network 105. In these or other embodiments, the social network server 101 is coupled to and interacts with the SMS gateway 150 directly via signal line 104. The social network server 101 is also coupled for communication with the user devices 115a, 115b . . . 115n via, for example, the network 105, a combination of the network 105 and the mobile network 106, or the mobile network 106 via a dedicated signal path. It should be understood that the social network server 101 can be stored in any combination of the devices and servers, or in only one of the devices or servers.

The social network server 101 includes a social network software/application 102. The social network software/application 102 is software including routines for providing functionality for a social network. In some embodiments, the social network software/application 102 is a set of instructions executable by the processor 235 (see FIG. 2) for providing the functionality for the social network. In other embodiments, the social network software/application 102 is stored in the memory 237 (see FIG. 2) of the social network server 101 and is executable by the processor 235 (see FIG. 2). In any of these embodiments, the social network software/application 102 may be adapted for cooperation and communication with the processor 235 (see FIG. 2) and the other components of the social network server 101 via the bus 220 (see FIG. 2). Although only one social network server 101 is shown, multiple social network servers 101 may be included in the system 100.

A social network is any type of social structure where the users are connected by one or more common features. The common features include relationships/connections, e.g., friendship, family, work, an interest, etc. The common features are provided by one or more social networking systems, such as those included in the system 100, including explicitly-defined relationship and relationships implied by social connections with other online users, where the relationships form a social graph 130.

In some examples, the social graph 130 can reflect a mapping of these users and how they are related. Furthermore, it should be understood that social network server 101 and social network software/application 102 are representative of one social network and that there may be multiple social networks coupled to the network 105, each having its own server, application and social graph 130. For example, a first social network is more directed to business networking, a second more directed to or centered on academies, a third more directed to local business, a fourth directed to dating and others of general interest or a specific focus. In some embodiments, the social graph 130 is server hardware and a data repository for managing the data describing the social graphs of the users of various social networks including the social network represented by the social network server 101 and the social network software/application 102. In other embodiments, the social graph 130 is included in the social network server 101.

The group messaging engine 103 is software including routines for exchanging messages between a group of users 125. In some embodiments, the group messaging engine 103 is operable on the social network server 101. In other embodiments, the group messaging engine 103 is operable on the client user device 115a. While FIG. 1 only illustrate the social network server 101 and user device 115a as including the group messaging engine 103, in practice, any of the depicted devices as well as other devices such as third-party servers could include the group messaging engine 103. Additional structure and functionality of the group messaging engine 103 are described below with reference to at least FIGS. 2-6R.

The user devices 115a, 115b . . . 115n are computing devices having data processing and data communication capabilities. If some embodiments, the user device 115 is a handhold wireless computing device which is capable of sending and receiving voice and data communications. For example, the user device 115 may include a processor, a memory, a power source and one or more network interfaces to broadcast and receive control data, voice data and/or network data via radio signals. The user device 115 may also include one or more of a graphics processor, a high-resolution touchscreen; a physical keyboard; forward and rear facing camera; sensors such as accelerometers and/or gyroscopes; a GPS receiver; a Bluetooth module; memory storing applicable firmware; and various physical connection interfaces (e.g., USB, HDMI, headset jack, etc.); etc. Additionally, an operating system for managing the hardware and resource of the user device 115, application programming interfaces (APIs) for providing applications access to the hardware and resources, a user interface module for generating and displaying interfaces for user interaction and input, and applications such as applications for making phone calls, video calls, web browsing, messaging, social networking, gaming, capturing digital video and/or images, etc., may be stored and operable on the user device 115. In some embodiments, a user device 115 comprises a workstation computer, a desktop computer, a laptop computer, a netbook computer, a tablet computer, a smartphone, a set-top box/unit, an Internet Protocol-connected smart TV including a computer processor capable of receiving viewer input, accessing video content on computer networks such as the Internet, and executing software routines to provide enhanced functionality and interactivity to viewers, or the like. In other embodiments, different user devices 115a, 115b . . . 115n comprise different types of computing devices. For example, the user device 115a is a smartphone, the user device 115b is a mobile phone of the non-smart phone variety and the user device 115n is a tablet computer. In some embodiments, the user device 115 is a client or terminal device. The user devices 115a, 115b ... 115n in FIG. 1 are included by way of example. While FIG. 1 illustrates three or more user devices, the present disclosure applies to any system architecture having one or more user devices.

In some embodiments, the user device 115a is coupled to the mobile network 106 via signal lines 116 and 118 and coupled to the network 105 via signal line 114. The user 125a interacts with the user device 115a via signal line 120. In other embodiments, the user device 115b is coupled to the mobile network 106 via signal line 122 and the user 125b interacts with the user device 115b via signal line 124. In yet other embodiments, the user device 115n is coupled to the network 105 via signal line 126 and the user 125n interacts with the user device 115n via signal line 128.

In some embodiments, the user device 115a includes the group messaging application 107. The group messaging application, 107 is software including routines for exchanging messages with other users via the group messaging engine 103. For example, the group messaging application 107 is operable to instruct the user device 115a to render user interfaces, receive user input, and send information to and receive information from the group messaging engine 103a or 103b. In some embodiments, the group messaging application 107 is a set of instructions executable by the processor 335 (see FIG. 3) to provide the functionality described herein. In other embodiments, the group messaging application 107 is stored in the memory 337 (see FIG. 3) of the user device 115a and is accessible and executable by the processor 335 (see FIG. 3) to provide the functionality described herein. In any of these embodiments, the group messaging application 107 may be adapted fit cooperation and communication with the processor 335 (see FIG. 3) and other components of the user device 115a via the bus 320 (see FIG. 3). Additional structure and functionality of the group messaging application 107 is discussed below with reference to at least FIGS. 3, 7 and 8 below. The user device 115a may also optionally include the group messaging engine 103b, which is also described in further detail below with reference to at least FIGS. 2-6B. While FIG. 1 only illustrates the user device 115a as including the group messaging application 107 and the group messaging engine 103b, in practice, any number of user devices 115 could include these elements.

The network 105 is a conventional type, wired or wireless, and may have any number of configurations such as a star configuration, token ring configuration or other known configurations. Furthermore, the network 105 may comprise a local area network (LAN), a wide area network (WAN) (e.g., the Internet), and/or any other interconnected data path across which multiple devices may communicate. In some embodiments, the network 105 may be a peer-to-peer network. The network 105 may also be coupled to or includes portions of the mobile network 106, or other telecommunications networks, for sending data in a variety of different communication protocols including short messaging service (SMS), multimedia messaging service (MMS), extended Messaging Service (XMS), hypertext transfer protocol (HTTP) direct data connection, wireless access protocol (WAP), various email protocols, etc. In some embodiments, the network 105 includes Bluetooth communication networks for sending and receiving data.

A network data connection is a data link that couples a user device 115 to the network 105 for communication with the connection server 140, the social network server 101, and the other entities of the system 100 coupled to the network 105. A user device 115 may be coupled to the network 105 either directly or indirectly. In the depicted embodiment, the user devices 115a and 115n connect directly to the network 105 via signal lines 114 and 126, respectively. The use devices 115a and 115n may include a wireless network interface controller for sending and receiving data packets to an access point of the network 105. For example, the user devices 115a and 115n may be Wi-Fi enabled devices which connect to wireless local area networks (WLANs), such a wireless hotspots. In these or other embodiments, the user device 115a indirectly connects to the network 105 via a signal line 118, mobile network 106 and signal line 127. For example, the user device 115 connects to the network 105 via a wireless wide area network (WWAN) of the mobile network 106. The mobile network may route the network data packets sent and received by the user device 115a over the mobile network 106 and signal line 127. Signal lines 114 and 118 are depicted using dashed lines to illustrate that a network data connection established via these signal lines 114 and 118 can become unavailable.

The mobile network 106 is a cellular network including distributed radio networks and a hub. In some embodiments, the radio networks include groups of transceiver nodes (i.e., cell sites) which are distributed over a geographic area. Each group of transceiver nodes is controlled by a controller device (either within the radio network or hub of the mobile phone network). The transceiver nodes communicate wirelessly over radio channels with nearby user devices 115. The controller devices determine which of the transceiver nodes is best situated to receive and send data to a nearby user device 115 and controls handovers from transceiver node to transceiver node as the user device 115 moves in and out of range. The mobile network 106 and user devices 115 may use a multiplexing protocol or a combination of multiplexing protocols to communicate including frequency division multiple access (FDMA), time-division multiple access (TDMA), code division multiple access (CDMA), space division multiple access (SDMA), wavelength division multiple access (WDMA) and random access protocols, or any derivative protocols such as orthogonal frequency division multiple access (OFDMA), orthogonal frequency-hopping multiple access (OFHMA), etc. The mobile network 106 and user devices 115 may also employ multiple-input and output (MIMO) channels to increase the data throughput over the signal lines coupling the mobile network 106 and user devices 115. The mobile network 106 may be any generation mobile phone network. In some embodiments, the mobile network 106 is a 2G or 2.5G Global System for Mobile Communications (GSM), IS-95, etc., network. In other embodiments, the mobile network 106 is a 3G (Universal Mobile Telecommunications System) UTMS, IS-2000, etc., network. In yet other embodiments, the mobile network 106 is a 4G Evolved High-Speed Packet Access (HSPA+), 3GPP Long Term Evolution (LTE), Worldwide Interoperability for Microwave Access (WiMax™), etc., network. In even yet other embodiments, the mobile network 106 may be any known mobile network type or may be a backwards-compatible multi-generational network that supports two or more technology standards.

A channel is of a pair of distinct radio frequency signals, i.e., a sending signal and a receiving signal, which couples a user device 115 to the mobile network 106. For example, a control channel is channel over which SMS data, identification data, and setup data is transmitted, a voice channel is a channel over which voice data is transmitted during a voice call, and a network data channel is a channel over which network data packets are transmitted, which may include both voice data packets application data packets. In some embodiments, signal lines 116 and 118 comprise one or more channels for sending and receiving data between a user device 115a ad a transmission node of the mobile network 106. In a 2G or 3G mobile network, for example, signal line 116 may comprise a control channel and voice channel, and signal line 118 may compromise a data channel. The user device 115 and a transmission node of the mobile network 106 communicate control data back and forth over the control channel to setup a voice call or a data packet transmission. Based in part on this control data, a controller device of the mobile network 106, such as a transmission node controller or a radio network controller, determines an appropriate voice channel for the voice call and assigns the voice call to the voice channel, or determines an available data channel 118 for sending and receiving network data packets for an application operating on the user device 115. In this example, the data channel 118 is a channel comprising a pair of radio frequency signals distinct from those of the voice and control channels 116. In another example including some 4G and later mobile phone networks, signal line 116 constitutes the control channel and signal line 118 constitutes the data channel, thus omitting the voice channel. The data channel is used to transmit both voice data and application data as network data packets, such as Internet Protocol (IP) data packets. In this other example, the core network of the mobile network 106 includes a packet-switching devices that route the data packets received from the user device 115 based on information included in a header of the data packets.

A fallback data connection is a data link that couples a user device 115 to the social network server 101 via the mobile network 106 and a fallback messaging server. The fallback messaging server is a server for relaying messages between the social network server 101 and the user devices 115. A fallback messaging protocol is a communication protocol used by the fallback messaging server for sending and receiving the message data via the fallback data connection and includes any standard messaging protocols such as SMS, MMS, XMS, WAP, Simple Mail Transfer Protocol (SMTP), Extensible Messaging and Presence Protocol (XMPP), Session Initial Protocol (SIP), Internet Relay Chat (IRC) protocol, etc. In some embodiments, the fallback messaging server is an SMS gateway 150 coupled to the mobile network 106 and the social network server 101, either directly via signal lines 131 and 104, respectively, or indirectly via the network 105. In other embodiments, the fallback messaging server is an email server 160 coupled to the mobile network 106 and the social network server 101 via the network 105. However, those examples are not exhaustive and other fallback messaging mechanisms, for example, an instant messaging (IM) server (not shown) coupled to the mobile network 106 and the social network server 101, are within the scope of the present disclosure.

The fallback data connection advantageously serves as a alternative data link to the network data connection for connecting the user device 115 to the fallback messaging server. In some embodiments, the control channel 116 coupling a user device 115 to the mobile network serves as segment of the fallback data connection. In other embodiments, a dedicate messaging channel coupling the user device 115 to the mobile network 106 serves as a segment of the fallback data connection. In these or other embodiments, the mobile network 106 and signal lines and/or the network 105 coupling the mobile network 106 to the fallback messaging server also constitute segments of the fallback data connection. For example, the fallback data connection connects a user device 115 to the fallback messaging server (e.g., the SMS gateway 150) via signal line 116, the mobile network 106 and signal line 131. In another example, the fallback data connection connects a user device 115 to the fallback messaging server (e.g., the SMS gateway 150) via signal line 116, the mobile network 106 and signal lines 127 and 117. While the present disclosure is described in the context of these embodiments and examples, it should be understood that the fallback data connection can be any data link that serves as an alternative data link to the network data connection and connects a user device 115 to the fallback messaging server.

The following are additional non-limiting examples of embodiments of the fallback data connection. A user device 115a is coupled to a node of the mobile network 106 via the control channel 116 and the data channel 118. The control channel 116 links to an SMS switching element (not shown) of the mobile network 106 and represents a segment of the fallback data connection. The data channel 118 links to a WWAN of the mobile network 106 which is interconnected with the network 105 and represents a segment of the network data connection. Heavy traffic by other user devices 115 also connected to this node of the mobile network 106 overwhelm the node with data traffic and the user device 115a is unable to connect to the network 105 via the WWAN. As a result, the social network server 101 is unable to connect and transmit message data to the user device 115a via the network data connection. The social network server 101 identifies that the network data connection is unavailable and transmits the message data as an SMS message to the user device 115a via the fallback data connection using the control channel 116, which is still able to transmit data to and from the user device 115a despite the heavy data traffic being experience by the node. In another example, a user device 115a is located in a remote geographic location of the mobile network 106 where cellular reception is poor and the user device 115a is only able to acquire a signal with a node of the mobile network 106 via the control channel 116, which represents a segment of the fallback data connection. Similar to the above example, the social network server 101 identifies that a network data connection to the user device 115a is unavailable and transmits the message data as an SMS message to the user device 115a via the fallback data connection using the control channel 116.

The search server 135 is communicatively coupled to the network 105 via signal line 112. In some embodiments, the search server 135 includes a search engine 143 for retrieving results that match search terms from the Internet. Although, only one search server 135 is shown, it should be understood that multiple search servers 135 may be present.

The connection server 140 is a server for generating and providing connection information for user devices 115. In the depicted embodiment, the connection server 140 is coupled to the network 105 via signal line 111. In some embodiments, the connection server 140 is a hardware server including a processor, memory and network communication capabilities. In other embodiments, the connection server 140 is a virtual server. In some embodiments, user devices 115 establish and maintain data connections to the connection server 140 via the network 105 whenever the user devices 115 are coupled to the network 105 via a network data connection and can send and receive network data. Upon request, the connection server 140 generates connection information for one or more user devices 115 and sends the connection information to the device requesting the information. For example, the connection server 140 tests whether a user device 115 is connected to the connection server 140, generates connection information including a verification signal describing the results of the connection test, and sends the connection information to the device requesting it. In some embodiments, when a user device 115 establishes a network data connection to the network 105, the user device 115 logs into the connection server 140 using a unique identifier associated with the group messaging engine 103, such as a user identifier for the social network software/application 102. Accordingly, provided user authorization is given, the connection server 140 is aware of the user identifiers that are logged into the connection server 140 and can provide confirmation of such to the group messaging engine 103 of the social network server 101 and the other components of the system 100. In these or other embodiments, the connection server 140 tests whether an open data connection exists to the user device 115 via a network data connection by sending a verification request, such as an Internet control message protocol (ICMP) echo request, to the user device 115. If the connection is active, the user device 115 confirms receipt of the verification request by sending a confirmation signal, such as an echo reply (i.e., ping), via a network data connection and the network 105. If the connection is no longer active, no response is received from the user device 115 and the verification request times-out.

In some embodiments, the group messaging engine 103 instructs the social network server 101 to request verification from the connection server 140 that a user device 115 is connected to the network 105 via a network data connection. In other embodiments, the group messaging engine 103 instructs the social network server 101 to request verification from the connection server 140 that a group messaging application 107 is operable or actively operating by a processor of a user device 115. While FIG. 1 depicts the connection server 140 as a stand-alone entity, the connection server 140 may be included in the other elements of the system 100 including the social network server 101. Additionally, while only one connection server 140 is depicted, the system 100 may include any number of connection servers 140. For example, connection servers 140 may distributed by geographic region to facilitate a quicker and more efficient connection to the connection servers 140 by the user devices 115 located in those regions. In another example, if a particular connection server 140 is overloaded with traffic, a user device 115 may connect to other less utilized connection servers 140.

The notification server 145 is a server for providing notifications to one or more user devices 115. In the depicted embodiment, the notification server 145 is coupled to the network 105 via signal line 113. In some embodiments, the notification server 145 is a hardware server including a processor, memory and network communication capabilities. In other embodiments, the notification server 145 is a virtual server. The notification server 145 may include a push notification service (PNS), which is software including routines executable by a processor (not shown) of the notification server 145 to instruct the notification server 145 to forward push notifications to one or more user devices 115 via the network 105. The push notifications are received by the notification server 145 from the social network server 101, other entities of the system 100 or other third party servers (not shown), and are forwarded to the one or more user devices 115 via the network 105. Some examples of push notifications include custom text notifications, badges indicating the number of notifications that await review, and sounds.

In some embodiments, use of push notifications is unnecessary because the group messaging application 107 can be initialized and an interface can be displayed to the user 125; upon receipt of a signal from the group messaging engine 103. In other embodiments where a user device 115a is limited to receiving push notifications for any applications that are not active or whose interfaces are not actively being displayed to the user 125a, push notifications received by the user device 115a from the notification server 145 are displayed to the user 125a to inform the user of any new group messaging activity that has occurred. While FIG. 1 depicts the notification server 145 as a stand-alone entity, the notification server 145 may be included in the other elements of the system 100 including the social network server 101. Additionally, while only one notification server 145 is depicted, more than one notification server 145 may be included in the system 100.

The SMS gateway 150 is a fallback messaging server for sending and receiving message data via the fallback data connection. In the depicted embodiment, the SMS gateway 150 is coupled to the network 105 via signal line 117. The SMS gateway 150 may also be directly coupled to the social network server 101 via signal line 104 for direct communication between those entities. In some embodiments, the SMS gateway 150 is a hardware server including a processor, memory and network communication capabilities. In other embodiments the SMS gateway 150 is a virtual server. While FIG. 1 depicts the SMS gateway 150 as a stand-alone entity, the SMS gateway 150 may be included in the other elements of the system 100 including the social network server 101. The SMS gateway 150 is not limited to sending and receiving SMS messages and may send and receive message data using any mobile messaging protocol in any messaging format including MMS, XMS, etc. Accordingly, in addition to its conventional meaning, the term "text message" may include only text or any combination of text, graphics, audio, video, etc.

In some embodiments, the SMS gateway 150 is a direct to mobile gateway which connects directly to a mobile network 106 via signal line 131 and communicates with the user devices 115 operating on a mobile network 106. In other embodiments, the SMS gateway 150 is an aggregator or SS7-type mobile gateway, which interfaces with a mobile network 106 via the network 105. In these other embodiments, the SMS gateway 150 is coupled to the network 105 via signal line 117; communicates with the mobile network 106 via signal lines 117 and 127; and sends and receives text messages using a gateway element of the mobile network 106. The gateway element, such as a short message service center (SMSC) gateway, controls the message delivery to and from the user devices 115 operating on the mobile network.

In some embodiments, the SMS gateway 150 receives text messages from the social network server 101 and relays the text messages to the designated recipient user devices 115 using a corresponding text messaging protocol. For example, the SMS gateway 150 converts message data received from the social network server 101 to a text message format (e.g., SMS) and dispatches the text message via SMS protocol to the recipient or recipients indicated in the message data. In another example, the message data received by the SMS gateway 150 is pre-formatted in a text message format (e.g., SMS) and the SMS gateway 150 relays the message data to the recipient or recipients identified in a header of the message data. In other embodiments, the SMS gateway 150 receives a text message from a user device 115 via the fallback data connection and relays the text message to the group messaging engine 103 of the social network server 101. The SMS gateway 150 may relay the text message to the group messaging engine 103 in the same format in which it was received by the SMS gateway 150 or the SMS gateway 150 may convert the text message to another format compatible with the group messaging engine 103 and then relay the converted message to the group messaging engine 103.

The data link by which the SMS gateway 150 receives and relays text messages advantageously serves as a fallback data connection should a user device 115 be unable to establish a network data connection to the network 105 and connect to the connection server 140. For example, as previously described, the signal lines 116 and 122 may include control channels which couple the user devices 115a and 115b to transmission nodes of the mobile network 106. Responsive to receiving the message data in the form of an SMS message, switching elements of the mobile network 106 relay the SMS message to and from the SMS Gateway 150 either directly via signal line 131 or indirectly via signal lines 127 ant 117, and the network 105. As a result, the SMS message (i.e., the message data) can be advantageously delivered to the user device 115a or generated by and sent from a user device 115a even if the user device 115a is unable to establish a network data connection to connect to the connection server 140 (e.g., the user device 115a is unable to connect to the network 105 via a WWAN of the mobile network 106 over signal line 118 or a WLAN of the network 105 over signal line 114).

The email server 160 is a messaging server for sending, receiving and providing access to electronic mail (email). In same embodiments, the email server 160 serves as a fallback messaging server and sends and receives email via a fallback data connection. In some embodiments, the email server 160 is a hardware server including a processor, memory and network communication capabilities, and is coupled to the network 105 via signal line 136. In other embodiments, the email server 160 is a virtual server. The email server 160 includes email server software operable for sending, storing, receiving and providing access to email. The email server 160 includes server software operable to transmit email between any of the constituent elements of the system 100. For example, the email server 160 receives, stores and relays emails sent by a user device 115 to the social network server 101 and vie versa. In some embodiments, email is transmitted by the email server 160 and other elements of the system 100 over the network 105 using protocols such as SMTP, IMAP, POP, Webdav, etc. In other embodiments, the email server 160 relays email messages between the social network server 101 and the user devices 115 via the mobile network 106 using a fallback data connection. While only one email server 160 is depicted, any number of email servers 160 could be included in the system 100.

Social Network Server 101

Figure 2:
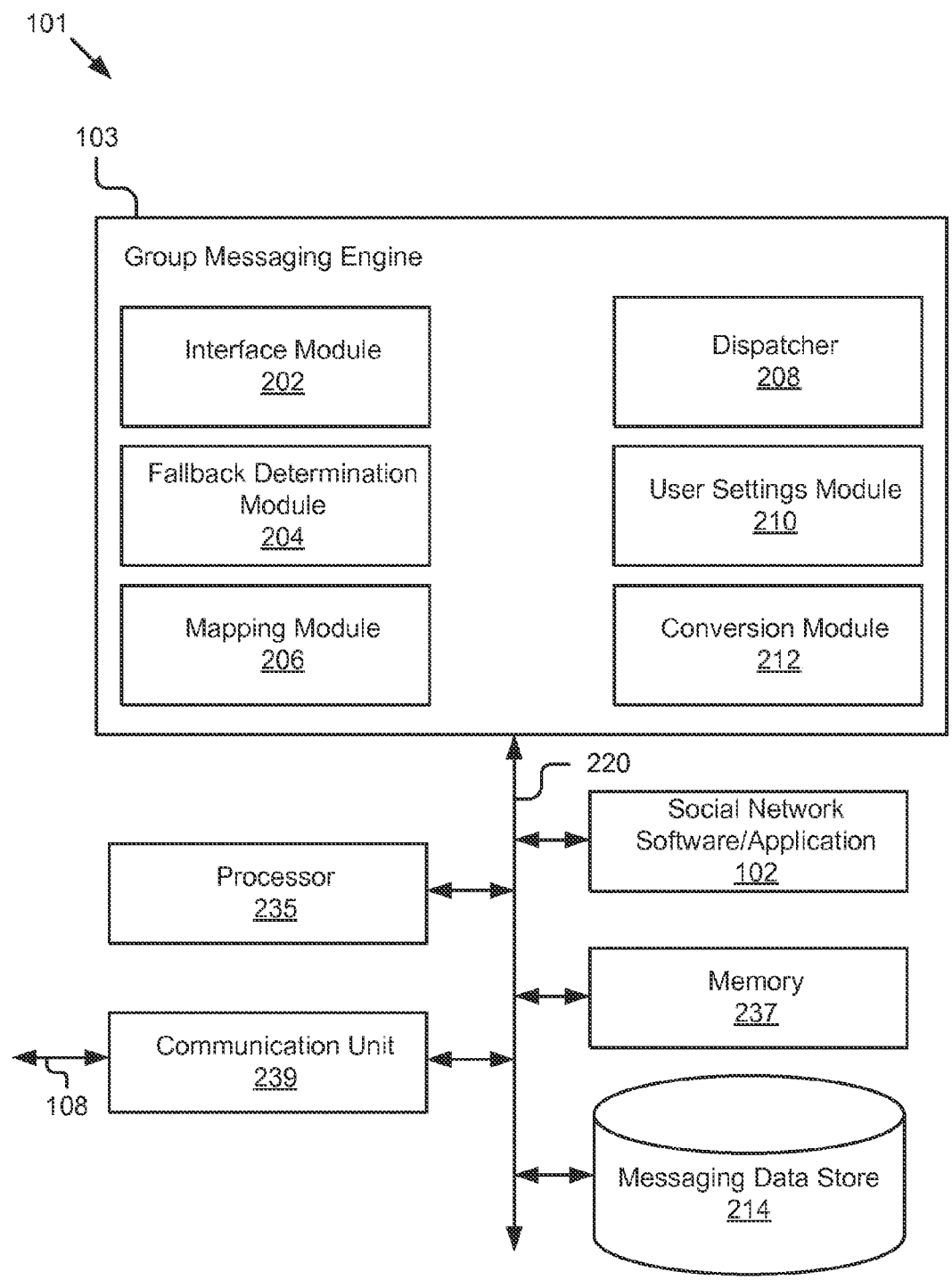
FIG. 2 is a block diagram illustrating a social network server according to some embodiments of the present disclosure.

FIG. 2 is a block diagram of a social network server 101 according to some embodiments. In the depicted embodiment, the social network server 101 is a computing device comprising a social network software/application 102, a group messaging engine 103, a messaging data Store 214, a processor 235, a memory 237 and a communication unit 239. The components 102, 103, 214, 235, 231 and 239 are communicatively coupled via a communication bus 220. The bus 220 can be any type of conventional communication bus for transferring data between components of a computer, or between computers.

The processor 235 comprises an arithmetic logic unit, a microprocessor, a general purpose controller or some other processor array to perform computations and provide electronic display signals to a display device (not shown). The processor 235 is coupled to the bus 220 for communication with the other components of the social network server 101. Processor 235 processes data signals and may comprise various computing architectures including a complex instruction act computer (CISC) architecture, a reduced instruction set computer (RISC) architecture, or an architecture implementing a combination of instruction sets. Although only a single processor is shown in FIG. 2, multiple processors may be included. The processing capability might be limited to supporting the display of images and the capture and transmission of images. The processing capability might be enough to perform more complex tasks, including various types of feature extraction and sampling. If should be understood that other processors, operating systems, sensors, displays and physical configurations are possible.

The memory 237 stores instructions and/or data that may be executed by processor 235. The memory 237 is coupled to the bus 220 for communication with the other components of social network server 101. The instructions and/or data may comprise code for performing any and/or all of the techniques described herein. The memory 237 may be a dynamic random access memory (DRAM) device, a static random access memory (SRAM) device, flash memory or some other known memory device. In some embodiments, the memory 237 also includes a non-volatile memory or similar permanent storage device and media including, for example, a hard disk drive, a floppy disk drive, a CD-ROM device, a DVD-ROM device, a DVD-RAM device, a DVD-RW device, a flash memory device or some other mass storage device known for storing information on a more permanent basis. For clarity, instructions and/or data stored by the memory 237 or 337 (see FIG. 3) are described herein as different functional "modules" or "engines," where different modules or engines are different instructions and/or data stored in the memory 237 or 337 (see FIG. 3) that cause the described functionality when executed by the processor 235 or 335 (see FIG. 3).

The communication unit 239 is coupled to the network 105 by the signal line 108 and coupled to the bus 220. In some embodiments, the communication unit 239 is a network interface device (I/F) which includes ports for wired connectivity. For example, the communication unit 239 includes a CAT-5 interface, USB interface, or SD interface, etc. The communication unit 239 links the processor 235 to the network 105 that may in turn be coupled to other processing systems. The communication unit 239 provides other connections to the network 105 and to other entities of the system 100 (e.g., the SMS gateway 150) using standard communication protocols including, for example, TCP/IP, HTTP, HTTPS, SMTP, SMS, MMS, XMPP, SIP, IRC, etc. In other embodiments, the communication unit 239 includes a transceiver for sending and receiving signals using Wi-Fi, Bluetooth® or cellular communications for wireless communication.

Group Messaging Engine 103

The group meaning engine 103 is software including routines for exchanging messages between a group of users 125. In some embodiments, the group messaging engine 103 is a set of instructions executable by the processor 235 to provide the functionality for exchanging messages between a group of users 125. In other embodiments, the group messaging engine 103 is stored in the memory 237 of the social network server 101 and is accessible and executable by the processor 235 to provide this functionality. In any of these embodiments, the group messaging engine 103 may be adapted for cooperation and communication with the processor 235 and the other components of the social network server 101 via the bus 220. The messages exchanged by the group messaging engine 103 under a default implementation, are exchanged using a native messaging protocol. In some embodiments, the native messaging protocol is an instant messaging protocol suitable for communication across an IP network (e.g., the Internet). For example, the native messaging protocol is XMPP, SIP, IRC, HTTP, etc.

In the depicted embodiment, the group messaging engine 103 comprises an interface module 202, a fallback determination module 204, a mapping module 206, a dispatcher 208, a user settings module 210 and a conversion module 212. The components 202, 204, 206, 208, 210 and 212 of the group messaging engine 103, and the group messaging engine 103 itself, are communicatively coupled to the bus 220 for communication with each other and the other components 102, 214, 235, 237 and 239 of the social network server 101. The group messaging engine 103 interacts and communicates with the social network software/application 102 via the bus 220. For example, the group messaging engine 103 can interact with a credentials module (not shown) of the social network software/application 102 to authenticate users 125 seeking access to the group messaging engine 103, and to provide the group messaging engine 103 access to information and functionality of the social network software/application 102 and the social graph 130. In other embodiments, the group messaging engine 103 is stored and operable on a third-party server (not shown) which is coupled by the network 105 for communication and interaction with the social network server 101, the social network software/application 102 and the social graph 130. In these or other embodiments, the group messaging engine 103 may access information and utilize the functionality of the social network software/application 102 and the social graph 130 via an API.

The interface module 202 is software including routines for receiving request signals via the communication unit 239, parsing message data from the request signals and sending the message data to and receiving information from the fallback determination module 204, the mapping module 206, the dispatcher 208, the user settings module 210 and the conversion module 212. In some embodiments, the interface module 202 is a set of instructions executable by the processor 235 to provide this functionality. In other embodiments, the interface module 202 is stored in the memory 237 of the social network server 101 and is accessible and executable by the processor 235 to provide this functionality. In any of these embodiments, the interface module 202 may be adapted for cooperation and communication with the processor 235 and other components of the social network server 101 via the bus 220.

In the depicted embodiment, the interface module 202 is coupled to the fallback determination module 204 via the bus 220 to send the parsed message data. For example, a user 125 composes a message to a group of recipients using an interface of the group messaging application 107 launched on the user device 115 and sends it by selecting a send button. In response, the user device 115 generates and sends a request signal including the message via the mobile network 106 and/or network 105 to the communication unit 239. The interface module 202 receives the request signal from the communication unit 239, parses the data associated with the message from the request signal and sends the message data to the fallback determination module 204 for further processing. In other embodiments, the interface module 202 may generate and send response signals confirming the successful receipt of the message data or the successful dispatch of the message included in the message data to the intended recipients by the group messaging engine 103.

The interface module 202 is coupled to the mapping module 206, the dispatcher 208, the user settings module 210, the conversion module 212 and the other components 102, 214, 235, 237 and 239 of the social network server 101 via the bus 220 to send and receive information. In some embodiments, the interface module 202 sends request signals received via the communication unit 239 to the user settings module 210 for further processing. In other embodiments, the interface module 202 is coupled to the messaging data store 214 to manipulate, i.e., store, query, update and/or delete, data using programmatic operations. In some embodiments, the interface module 202 stores message data parsed from, request signals received from other devices via the network 105. In other embodiments, the interface module 202 receives an archive request from a user device 115 to archive one or more messages stored on the user device 115. For example, if a user 125 desires to back-up older messages stored on the user device 115 (e.g., SMS messages and messages native to the group messaging application 107), the user can input a command into the group messaging application 107 launched on the user device 115 to have all or some of the messages sent to the social network server 101 for archiving. The user 125 can later input a command to retrieve those messages from the social network server 101, should the messages happen to be deleted from the user device 115 of the user 125.

The fallback determination module 204 is software including routines for determining the availability of a network data connection for a user device 115 and generating a routing signal based at least in part on the availability of the network data connection. In some embodiments, the fallback determination module 204 is a set of instructions executable by the processor 235 to provide this functionality. In other embodiments, the fallback determination module 204 is stored in the memory 237 of the social network server 101 and is accessible and executable by the processor 235 to provide this functionality. In any of these embodiments the fallback determination module 204 may be adapted for cooperation and communication with the processor 235 and other components of the social network server 101 via the bus 220.

The fallback determination module 204 is coupled to the interface 202 to receive message data sent by a user device 115. The fallback determination module 204 parses the message data for sender and recipient information. For example, the fallback determination module 204 parses the sender and recipient information from the metadata of the message data. The sender and recipients identified by the sender information and recipient information form a messaging group. The sender information includes identifying information for a user 125 or user device 115 that sent the message data. For example, the sender information includes one or more of a sender's user identifier associated with a social network software/application 102 user account, a network address of the sender's user device 115 (e.g., an IP address, port, etc.), a mobile phone number for the sender's user device 115, information about the computing environment of the user device 115 (e.g., operating system type and version and group messaging application 107 type and version), etc. The recipient information also includes identifying information for each user device 115 designated to receive the message data. For example, the recipient information includes ode or more of a recipient's user identifier associated with the recipient's user account for the social network software/application 102, a network address of the recipient's user device 115, a mobile phone number for the recipient's user device 115, etc.

The fallback determination module 204 is coupled to the connection server 140 via the network 105 to send a connection query and receive connection information. In some embodiments, the connection query generated and sent by the fallback determination module 204 includes a list of recipient identifiers from the recipient information. Using the list of identifiers, the connection server 140 determines whether user devices 115 identified by the identifiers are connected to the connection server 140, and generates and sends connection information to the fallback determination module 204 describing whether or not each of the user devices 115 is coupled to the connection server 140 via a network data connection. Additional structure and functionality of the connection server 140 is described above with reference to FIG. 1 and below with reference to FIGS. 4-6B. The fallback determination module 204 is coupled to the mapping module 206 via the bus 220 to send the connection information and receive mapping data. In some embodiments, the mapping data includes a fallback identifier for the recipients identified by the connection information as not being connected to the connection server 140. The fallback identifier is further discussed below.

The fallback determination module 204 is coupled to the dispatcher 208 via the bus 220, and sends the routing signal to the dispatcher 208 via the bus 220. In some embodiments, the routing signal generated by the fallback determination module 204 includes a dispatch instruction stating which delivery protocol should be used to send the message to each recipient. In some embodiments where a recipient's user device 115 is described by the connection information as not being connected to the connection server 140, the dispatch instruction generated by the fallback determination module 204 advantageously instructs the dispatcher 208 to relay the message to the fallback messaging server for dispatch via a fallback messaging protocol using the fallback data connection. This provides a recipient operating the recipient user device 115 the benefit of still being able to receive the message, even though the recipient user device 115 is not connected to the connection server 140 via a network data connection (e.g., an Internet connection). In some embodiments where the connection information describes a recipient user device 115 as being coupled to the network 105 via the network data connection and connected to the connection server 140, the dispatch instruction generated by the fallback determination module 204 instructs the dispatcher 208 to dispatch the message via the network data connection using the native messaging protocol. The routing signal can also include the connection information, mapping data or any information from the message data including sender ad recipient information necessary for the dispatcher 208 to send the message. For example, for the fallback recipients (i.e., the recipients designated to receive the message via the fallback messaging protocol), the routing signal includes mapping data such as the fallback identifier, as further described below.

The mapping module 206 is software including routines for mapping the message data being exchanged. In some embodiments, the mapping module 206 is a set of instructions executable by the processor 235 to provide the functionality described herein. In other embodiments, the mapping module 206 is stored in the memory 237 of the social network server 101 and is accessible and executable by the processor 235 to provide this functionality. In any of these embodiments, the mapping module 206 may be adapted for cooperation and communication with the processor 235 and other components of the social network server 101 via the bus 220.

The mapping module 206 is coupled via the bus 220 to the fallback determination module 204 to receive the connection information and the message data. The mapping module 206 analyzes the connection information, assigns a fallback identifier to the fallback recipients (i.e., each recipient designated to receive the message via the fallback messaging protocol), maps the message data to the group of users exchanging messages using the fallback identifier, and generates and provides mapping data including the fallback identifier to the fallback determination module 204. The mapping module 206 also stores the mapping data including the fallback identifier in the messaging data store 214 for later reference and revision. In some embodiments, the fallback identifier is a phone number drawn from a pool of phone numbers which identify the SMS gateway 150 as a telecommunications endpoint on the mobile network 106. In other embodiments, the fallback identifier is an email address drawn from a pool of email addresses assigned to the group messaging engine 103. In these or other embodiments, the fallback identifier assigned by the mapping module 206 may be assigned to one messaging group at a time to avoid conflicts with other messaging groups.

In some embodiments the fallback messaging protocol may require different identifying information for the fallback recipients or the user devices of the fallback recipients then the native messaging protocol does. For example, the native messaging protocol may require that each recipient be identified by a user identifier associated with the social network software/application 102, which can be mapped to a user device 115 using the connection information from the connection server 140. In contrast, the fallback messaging protocol may require that the fallback recipients be identified with an identifier associated with the fallback messaging protocol, such as a mobile phone number or an email address. In some embodiments, the identifying information associated with the native messaging protocol may be the same as the identifying information associated with the fallback messaging protocol. For example, a user may use the same email address for sending and receiving email as a user identifier for accessing the group messaging application 103. However, in, other embodiments, the identifiers may differ. In these other embodiments, the mapping module 206 is capable of retrieving the alternative identifying information associated with the fallback messaging protocol. For example, the mapping module 206 may query the social graph 130 or a user account associated with the social network software/application 102 for the alternative identifying information. In another example, alternative identifying information is included in the message data and the mapping module 206 parses the alternative identifying information from the message data. While the mapping module 206 is described as being capable of retrieving the alternative identifying information, in other embodiments, the dispatcher 208, the fallback determination module 204 or any other component of the group messaging server 103 or social network server 101 provide this functionality.

In some embodiments, the mapping module 206 associates a messaging thread of the group of users 125 exchanging messages (i.e., the messaging group) with a unique session identifier. In particular, the unique session identifier identifies a message thread associated with the message data being exchanged. For example, once an initial message is sent by a user 125 to one or more other users 125 via the group messaging engine 103, a message thread is formed. The message thread is added to when subsequent messages are exchanged between the users 125 in response to the initial message. The messages are identified as belonging to the same message thread by the unique session identifier. In some embodiments, the messages dispatched and received via the fallback messaging protocol are associated with the message thread by the mapping module 206 mapping the fallback identifier assigned to the fallback recipients to the unique session identifier associated with the message thread.

In some embodiments, the message data received by the fallback determination module 204 represents a reply message sent in response to a previous message dispatched by the dispatcher 208 via the fallback data connection. The fallback determination module 204 can determine whether the reply message was sent via the fallback data connection in a number of ways. In some embodiments, the fallback determination module 204 determines the reply message as having been sent via the fallback data connection by providing the sender information from the reply message to the mapping module 206, and the mapping module 206 indicating that the sender information includes a fallback identifier. In other embodiments, the fallback determination module 204 determines the message data as having been sent via the fallback determination module 204 from a communications port and/or IP address via which the reply message data was received, the protocol used to send the reply message data, etc.

In some embodiments where the reply message data was sent via the fallback data connection, the mapping module 206 uses the seder information provided by the fallback determination module 204 to query the messaging data store 214 for stored mapping data. For example, the mapping module 206 queries the messaging data store 214 using a fallback identifier included in the sender information to determine the messaging group, and in particular, the recipients from the messaging group that the reply message should be dispatched to. The mapping module 206 then provides this information to the fallback determination module 204 and the fallback determination module 204 provides this information to the dispatcher 208 as recipient information as described above and further below. By way of example, the group messaging engine 103 determines that a network data connection to a user device 115 is not available so message data is dispatched to the user device 115 in the form of an SMS message via the fallback data connection. In response, reply SMS message data is received from the user device 115 via the fallback data connection. The mapping module 206, using the sender's phone number (i.e., the fallback identifier) provided by the fallback determination module 204, queries the messaging data store 214 for mapping data that maps the fallback identifier to the other member(s) of the messaging group, which in this example is the user who sent the initial message data. The mapping module 206 provides this mapping data to the fallback determination module 204 and the fallback determination module 204 uses the mapping data to determine if a network data connection exists for the user who sent the initial message data, and dispatches the reply message data accordingly. Additional structure and functionality of the mapping module 206 is described below with reference to at least FIGS. 4-8.

The dispatcher 208 is software including routines for dispatching the message data via the network data connection at the fallback data connection based in part on the routing signal. In some embodiments, the dispatcher 208 is a set of instructions executable by the processor 235 to provide the functionality. In other embodiments, the dispatcher 208 is stored in the memory 237 of the social network server 101 and is accessible and executable by the processor 235 to provide the functionality. In any of these embodiments, the dispatcher 208 may be adapted for cooperation and communication with the processor 235 and other components of the social network server 101 via the bus 220. In the depicted embodiment, the dispatcher 208 is coupled to the interface module 202, the fallback determination module 204, the mapping module 206, the user settings module 210, the conversion module 212 and the messaging data store 214 to send and receive information via the bus 220. In some embodiments, the dispatcher 208 receives the message data and the routing signal from the fallback determination module 208. In other embodiments, the dispatcher 208 receives the message data from the interface module 202.

The dispatcher 208 may optionally convert the message data prior to dispatching the message data. In some embodiments, responsive to receiving the message data and the routing signal, the dispatcher 208 may instruct the conversion module 212 to convert the message data to a format compatible with the protocol being used to send the message data. For example, the dispatcher 208 instructs the conversion module 212 to convert the message data to a format compatible with the fallback messaging protocol for the fallback recipients, and convert the message data to a format compatible with the native messaging protocol for the recipients designated to receive the message via the native messaging protocol. The dispatcher 208 provides the conversion module 212 with the information necessary to perform the conversion and upon performing the conversion, the conversion module 212 provides the formatted message data to the dispatcher 208 for dispatch.

In some embodiments, the dispatcher 208 dispatches the message data according to a dispatch instruction included in the routing signal. As previously described with reference to the fullback determination module 204, the dispatch instruction states which delivery protocol should be used to send the message data. In some embodiments, the dispatch instruction instructs the dispatcher 208 to dispatch the message data to the fallback recipients via the fallback data connection using the fallback messaging protocol. The dispatcher 208 modifies the message data, such as the recipient info ration ad the sender information, to correspond with the fallback identifier and the fallback recipient information mapped by the mapping module 206 and sent to the fallback determination module 204 for provision to the dispatcher 208 with the routing signal. The dispatcher 208 is coupled to the fallback messaging server and relays the message data to the fallback messaging server for dispatch to a user device 115 of each of the fallback recipients via the fallback data connection. For example, the fallback messaging server is the SMS gateway 150, the email server 160, an IM server, etc. In a more detailed example, the dispatch instruction included in the routing signal instructs the dispatcher 208 to dispatch the message data using a text messaging protocol (e.g., SMS), the dispatcher 208 converts the message data into a text message format using the conversion module 212, annotates the sender and recipient information to describe the fallback sender and recipient information (i.e., phone numbers) mapped by the mapping module 206, and the dispatcher 208 relays the formatted message data to the SMS gateway 150. The SMS gateway 150, using a text messaging protocol, transmits the formatted text message to a user device 115 of each of the fallback recipients via the fallback data connection over the mobile network 106. In another example, the fallback messaging protocol is an email protocol. In this example, the dispatcher 208 converts the message data to an email for each of the fallback recipients using the conversion module 212. The email server 160 then annotates each email with fallback sender and recipient information mapped by the mapping module 206, and dispatches the emails to the email server 160 and the email server 160 delivers the emails to the fallback recipients via the fallback data connection. In some embodiments, the email server 160 transmits the emails to the user devices 115 of the fallback recipients real-time using a push email protocol. In other embodiments, the email server 160 holds the emails until they are retrieved, from the email server 160 via an email protocol by an instance of the group messaging application 107 operating on the user device 115 of each of the fallback recipients. In yet another example, the dispatch instruction instructs the dispatcher 208 to dispatch the message via an IM protocol and the dispatcher 208 converts the message data, addresses it and dispatches it using the IM protocol via the fallback data connection or relays the message data to an IM server (not shown) for dispatch via the fallback data connection.

In some embodiments where one or more of the recipients of the message data are identified as having a network data connection, the dispatch instruction instructs the dispatcher 208 to dispatch the message data to the user device 115 of each of those recipients via the network data connection using a native messaging protocol. Based on the information included in the routing signal, the dispatcher 208 modifies the message data, such as the recipient information, to describe the recipients as being those users identified by the connection information as having a network data connection. In some embodiments, if some recipients are being sent the message data via the network data connection and some via the fallback data connection, the message data being sent via the network data connection is tagged with information to identify which message thread the message data belongs to. For example, a header of the message data is tagged with the unique session identifier or fallback identifier. This advantageously helps to ensure that any messages sent in reply will also be tagged with the same information so they can be mapped to the message thread and any fallback recipients by the mapping module 206.

The dispatcher 208 is coupled to the messaging data store 214 to store a copy of the message data. In some embodiments, the dispatcher 208 stores a copy of the message data in the format in which the message data was dispatched. In other embodiments, the dispatcher 208 stores a copy of the message data in the format in which the message data was received by the interface 202. In yet other embodiments, the dispatcher 208 stores a copy of the message data in the format in which it was received and in the format in which it was dispatched. In other embodiments, the interface 202 stores a copy of the message data as it is received. It should be understood that the message data is not limited to being stored by the dispatcher 208 and the interface 202, and that the other modules 204, 206, 210 and 212 of the group messaging engine 103 are capable of storing the message data.

The user settings module 210 is software including routines for determining, storing and retrieving user-configurable setting. In some embodiments, the user settings module 210 is a set of instructions executable by the processor 235 to provide this functionality. In other embodiments, the user settings module 210 is stored in the memory 237 of the social network server 101 and is accessible and executable by the processor 235 to provide this functionality. In any of these embodiments, the user settings module 210 may be adapted for cooperation and communication with the processor 235 and other components of the social network server 101 via the bus 220. In some embodiments, the user settings module 210 is coupled to the interface module 202 to receive the request signals. The user settings module 210 parses the request signals for user settings data and stores the user settings data in the messaging data store 214. In other embodiments, the user settings module 210 is coupled to receive request signals for user settings data from a user device 115 via the interface module 202. In response, the user settings module 210 retrieves the settings data from the messaging data store 214, and generates and sends response signals which include the settings data to the user device 115 via the interface module 202.

The user settings data instruct the group messaging engine 103 on how to function in various scenarios. For example, a user 125 can provide, via a user device 115, user settings data to instruct the group messaging engine 103 to default to the fallback messaging protocol for a period of time or until updated settings data are provided; to delay dispatch via the fallback messaging protocol until a predetermined amount of time has passed; to opt out of receiving messages via the fallback messaging protocol, to exempt certain recipients from receiving messages via a fallback messaging protocol; and to determine the which protocol to use as the fallback messaging protocol (e.g., SMS, MMS, email, etc.), etc. However, the foregoing examples are not exhaustive of the types of user settings data that can be provided, and it should be understood that any functionality of the fallback determination module 204 can be regulated by user settings data provided by a user 125. In some embodiments, the user settings module 210 is coupled to the fallback determination module 204 via the bus 220 to provide one or more user-configurable settings and the fallback determination module 204 may generate the routing signal based at least in part on the one or more user-configurable settings.

The conversion module 212 is software including routines for converting the message data. The conversion module 212 may convert the message data to a format compatible with a protocol of the fallback data connection if the network data connection is determined to be unavailable by the fallback determination module 204 in cooperation with the connection server 140. In some embodiments, the conversion module 212 receives the message data in a format compatible with the protocol native to the group messaging engine 103. In other embodiments, the conversion module 212 converts the message data to a format compatible with the protocol native to the group messaging engine 103 and receives the message data in a format compatible with the protocol of the fallback data connection. The conversion module 212 is coupled to the dispatcher 208 via the bus 220 to send and receive information. In some embodiments the conversion module 212 receives the message data and a conversion instruction from the dispatcher 208 via the bus 220. The conversion instruction instructs the conversion module 212 to convert the message data, and indicates the protocol that the message data should be converted to or the format the message data should be converted to. The conversion module 212 then instructs the processor 235 via the bus 220 to convert the message data and provide it to the dispatcher 208. Additional functionality of the conversion module 212 is described above with reference to the dispatcher 208 and below with reference to FIGS. 4-6B, for example.

The messaging data store 214 is data storage for storing messaging-related data. The messaging data store 214 is coupled for communication with the components 202, 204, 206, 208, 210 and 212 of the group messaging engine 103 and the other components 105, 235, 237 and 239 of the social network server 101 via the bus 220. For example, the messaging data store 214 is coupled to the interface module 202, the fallback determination module 204 and the dispatcher 208 to send and receive the message-related data/information. In some embodiments, the messaging data store 210 stores information received, generated and sent by the other modules of the group messaging engine 103. For example, the messaging data store 214 stores message data, user settings data, conversion data, mapping data, fallback information, etc. The messaging data store 214 can also store as archive of a user 125's message data including text messages, group messages, instant messages, emails, etc. For example, a user 123 can back-up all messages stored in the user 125's user device 115 to the messaging data store 214 for later retrieval (e.g., should the messages be deleted from the user device 115). In some embodiments, the interface module 202 is coupled to the other modules of the group messaging engine 103 so these modules can manipulate, i.e., store, query, update and/or delete, data using programmatic operations.

In some embodiments the messaging data store 214 is a database management system (DBMS) operable on the social network server 101 and storable in the memory 237. For example, the database could be a structured query language (SQL) DBMS. In these embodiments, the social network server 101, and in particular, the group messaging engine 103 are coupled to the database via the bus 220 to store data in multi-dimensional tables comprised of rows and columns, and manipulate, i.e., insert, query, update and/or delete, rows of data using programmatic operations (e.g., SQL queries and statements).

User Device 115

Figure 3:
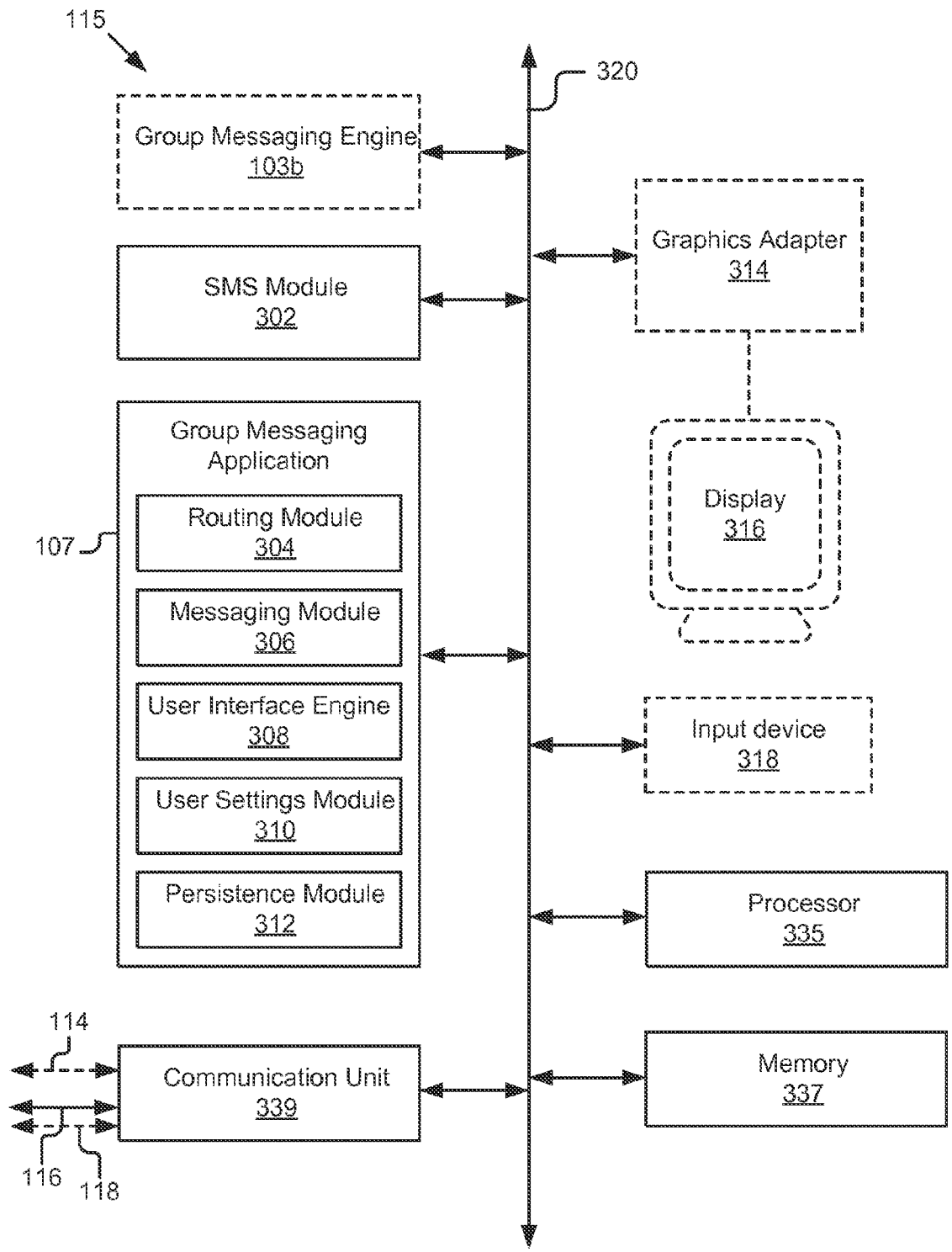
FIG. 3 is a block-diagram illustrating a user device according to some embodiments of the present disclosure.

FIG. 3 is a block diagram illustrating a user device 115 according to some embodiments of the present disclosure. In the depicted embodiment, the user device 115 includes an SMS module 302, a group messaging application 107, a graphics adapter 314, an input device 318, a processor 335, a memory 337 and a communication unit 339. The user device 115 also includes a display 316, which is coupled to the graphics adapter 314. The components 302, 107, 335, 337, 339, 103b, 314, 316, and 318 are communicatively coupled via the bus 320. The functionality of the bus 320 may be provided by an interconnecting chipset. In some embodiments, the user device 115 includes the group messaging engine 103b coupled to the bus 320 for communication with the other components of the user device 115. The group messaging engine 103b is described above with reference to FIG. 2, for example. The graphics adapter 314, the display 316, the input device 318 and the group messaging engine 103b are depicted using dashed lines to indicate that they are optional features of the user device 115.

The processor 335 comprises an arithmetic logic unit, a microprocessor, a general purpose controller or some other processor array to perform computations and optionally provide electronic display signals to the display device 316. The processor 335 communicates with the other components via the bus 320. Process 335 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. The user device 115 also includes an operating system executable by the processor 335.

The memory 337 stores instructions and/or data that may be executed by processor 335. The memory 337 communicates with the other components of user device 115 via bus 320. The instructions and/or data comprise code for performing any and/or all of the techniques described device. The memory 337 may be a dynamic random access memory (DRAM) device, a static random access memory (SRAM) device, flash memory or some other known memory device. In some embodiments, the memory 337 also includes a non-volatile memory or similar permanent storage device and media including, for example, a hard disk drive, a floppy disk drive, a CD-ROM device, a DVD-ROM device, a DVD-RAM device, a DVD-RW device, a flash memory device or some other mass storage device known for storing information on a more permanent basis. In some embodiments, the group messaging application 107 and/or the group messaging application 103b is stored in the memory 337 and executable by the processor 335.

The communication unit 339 includes interfaces for interacting with other devices/networks of devices. In some embodiments, the communication unit 339 includes transceivers for sending and receiving wireless signals. For example, the communication unit 339 includes radio transceivers (4G, 3G, 2G, etc.) for communication with the mobile network 106, and radio transceivers for WiFi and Bluetooth® connectivity. In the depicted embodiment the communication unit 339 is coupled to the network 105 by the signal line 114 and is coupled to the mobile network 106 via signal lines 116 and/or 118. In these or other embodiments, the communication unit 339 includes a network interface device (IF), which includes ports for wired connectivity. For example, the communication unit 339 includes a CAT-5 interface, USB interface, or SD interface, etc. The interfaces of the communication unit 339 provide the network data connection to the network 105, the fallback data connection via the network 106 and other connections to other networks and devices using the protocols discussed above with regard to FIGS. 1 and 2, for example. Additional structure and features of the communication unit 339 are described above with reference to at least these figures.

The SMS module 302 is software including routines for sending and receiving SMS messages to and from a user device 115. In some embodiments, the SMS module 302 is a set of instructions executable by the processor 335 to provide this functionality. In other embodiments, the SMS module 302 is stored in the memory 337 of the user device 115 and is accessible and executable by the processor 335 to provide this functionality. In any of these embodiments, the SMS module 302 may be adapted for cooperation and communication with the processor 335 and other components of the user device 115 via the bus 320. In some embodiments, the SMS module 302 includes an API that allows other modules of the user device 115 interact with the SMS module 302. For example, the routing module 306, which is communicatively coupled to the SMS module 302 via bus 320, uses the API of the SMS module 302 to dispatch text messages to the SMS gateway 150. The SMS module may populate fields of an interface generated and displayed by the user interface engine 308 at the instruction of the SMS module 302 based upon the commands received from the routing module 306 via the API. Alternatively, the SMS module may send text messages without any further interaction with the user 125, or can display prompts to the user 125 requesting authorization to send the text messages.

The graphics adapter 314 displays images and other information on the display 316. The graphics adapter 314 may be a separate processing device including a separate processor and memory (not shown) or may be integrated with the processor 335 and memory 337. The display 316 represents any device equipped to display electronic images and data as described herein. The display 316 may be any a conventional display device, monitor or screen, such as an organ light-emitting diode (OLED) display, a liquid crystal display (LCD). In some embodiments, the display 316 is a touch-screen display capable of receiving input from one or more fingers of a user 125. For example, the display 316 may be a capacitive touch-screen display capable of detecting and interpreting multiple points of contact with the display surface.

The input device 318 is any device for inputting data on the user device 115. In some embodiments, the input device 318 is a touch-screen display capable of receiving input from the one or more fingers of the user 125. The functionality of the input device 318 and the display 316 may be integrated, and a user 125 of the user device 115 may interact with the user device 115 by contacting a surface of the display 316 using one or more fingers. For example, the user 125 interacts with an emulated (i.e., virtual or soft) keyboard displayed on the touch-screen display 316 by using fingers to contacting the display in the keyboard regions. In other embodiments, the input device 318 is a separate peripheral device or combination of devices. For example, the input device 318 includes a keyboard (e.g., a QWERTY keyboard) and a pointing device (e.g. a mouse or touchpad). The input device 318 may also include a microphone, a web camera or other similar audio or video capture devices.

Group Messaging Application 107

The group messaging application 107 is software including routines for generating, sending and receiving message data. In particular the group messaging application 107 receives input signals from a user 125, generates message data and user settings from the input signals, sends message data to and receives message data from the group messaging engine 103, and manages user settings. In some embodiments, the group messaging application 107 is a set of instructions executable by the processor 335 to provide this functionality. In other embodiments, the group messaging application 107 is stored in the memory 337 of the user device 115 and is accessible and executable by the processor 335 to provide the functionality. In any of these embodiments, the group messaging application 107 may be adapted for cooperation and communication with the processor 335 and the other components of the user device 115 via the bus 320. In some embodiments, the messages generated, sent and received by the group messaging application 107 have a format compatible with the protocol native to the group messaging engine 103 or a format compatible with the fallback communication protocol as previously described.

In the depicted embodiment, the group messaging application 107 comprises a muting module 304, a messaging module 306, a user interface engine 308, a user settings module 310 and a persistence module 312. The muting module 304, the messaging module 306, the user interface engine 308, the user settings module 310 and the persistence module 312 are coupled for communication with each other and the other components of the user device 115 via the bus 320.

The muting module 304 is software including routines for selectively routing messages via the network data connection and the fallback data connection. In particular, the routing module 304 routes the messages based on whether a network data connection is available to the user device 115. In some embodiments, the routing module 304 is a set of instructions executable by the processor 335 to provide this functionality. In other embodiments, the muting module 304 is stored in the memory 337 of the user device 115 and is accessible and executable by the processor 335 to provide the functionality. In any of these embodiments, the routing module 304 may be adapted for cooperation and communication with the processor 335 and other components of the user device 115 via the bus 320.

The routing module 304 is coupled to the persistence module 312 via the bus 320 to send and receive information. In some embodiment, the routing module 304 requests connectivity information indicating whether a network data connection exists from the persistence module 312. The persistence module 312, responsive to the request, generates and sends the connectivity information to the routing module 304. The routing module 304 uses the connectivity information to determine whether to route messages via the network data connection or the fallback data connection. For example, the persistence module 312 sends connectivity information to the routing module 304 indicating that the user device 115 is not coupled to the network 105 via a network data connection (e.g., via a WLAN of the network 105 or a WWAN of the mobile network 106) and, based on the connectivity information, the muting module 304 routes the message via the fallback data connection a an SMS message. If the connectivity information indicates that a network data connection coupling the user device 115 to the network 105, either directly or indirectly, the routing module 304 routes the message data to the group messaging engine 103 via the network data connection using a protocol native to the group messaging application 107 and the group messaging engine 103.

The messaging module 306 is software for receiving, generating and storing the message data. In some embodiments, the messaging module 306 is a set of instructions executable by the processor 335 to provide this functionality. In other embodiments, the messaging module 306 is stored in the memory 337 of the user device 115 and is accessible and executable by the processor 335 to provide the functionality. In any of these embodiments, the messaging module 306 may be adapted for cooperation and communication with the processor 335 and other components of the user device 115 via the bus 320.

In some embodiments the messaging module 306 is coupled to the user interface engine 308 via the bus 320 to receive input signals describing the message input by the user 125. The messaging module 306 generates message data based on the input signals and sends the message data to the routing module 304 for routing to the social network server 101. In other embodiments, the messaging module 306 is coupled to the communication unit 339 to receive message data from the social network server 101, either via the network data connection or the fallback data connection. The messaging module 306 stores the message data in the memory 337 for later retrieval. For example, the user interface engine 308 retrieves the message data stored by the messaging module 306 and generates a main messaging interface displaying current and past message threads.

The user interface engine 308 is software including routines for rendering user interfaces and for receiving user input via the user interfaces. In some embodiments, the user interface engine 308 is a set of instructions executable by the processor 335 to provide this functionality. In other embodiments, the user interface engine 308 is stored in the memory 337 of the user device 115 and is accessible and executable by the processor 335 to provide this functionality. In any of these embodiments, the user interface engine 308 may be adapted for cooperation and communication with the processor 335 and other components of the user device 115 via the bus 320. The user interface engine 308 is coupled to the input device 318 via the bus 320 to receive input signals from the user 125. For example, a user 125 composes a message using the input device 318, and the user interface engine 308 receives signals describing the composed message and stores the signals in the memory 337 for retrieval by the messaging module 306. In other embodiments, the user interface engine 308 is coupled to the messaging module 306 via the bus 320 to provide the signals directly to the messaging module 306.

Figure 7:
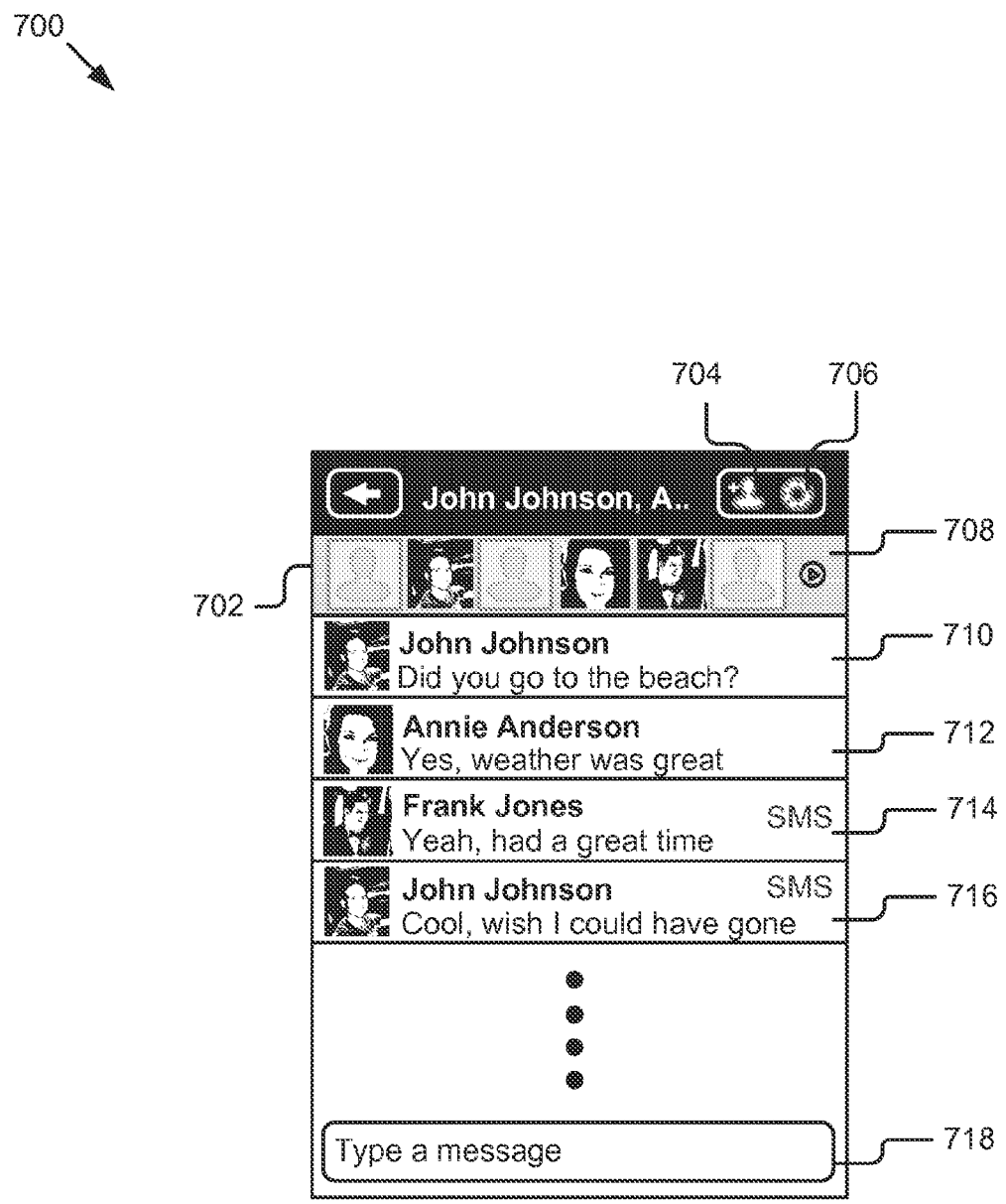
FIG. 7 is a graphic representation of a user interface for viewing a message thread according to some embodiments of the present disclosure.
Figure 8:
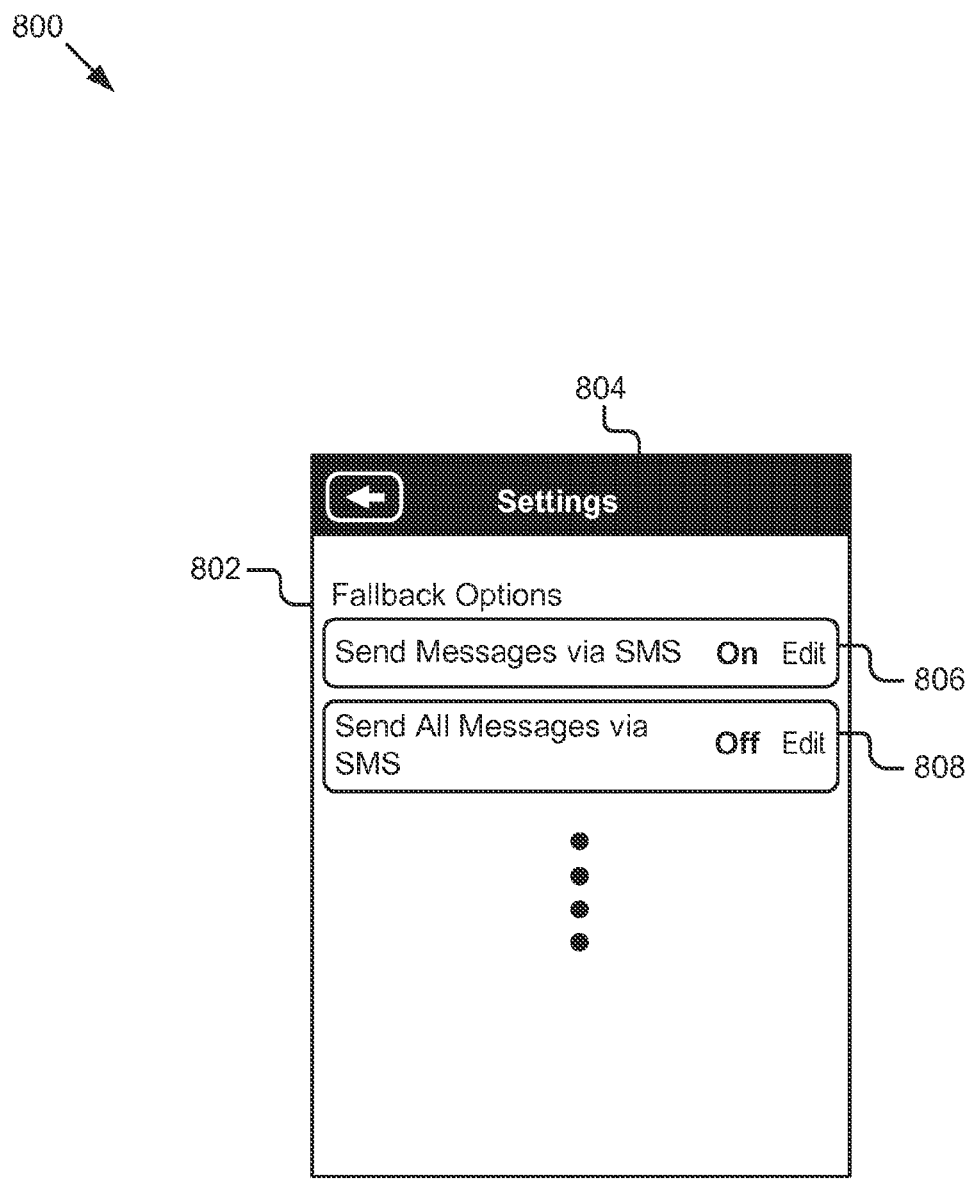
FIG. 8 is a graphic representation of a user interface for managing user settings according to some embodiments of the present disclosure.

The user interfaces generated by the user interface engine 308 can include, but are it limited to, a message entry form for composing messages, a main messaging interface for viewing sent and received messages (e.g., see FIG. 6), and a settings dialog (e.g., ee FIG. 7) for inputting, modifying and displaying user preferences related to the group messaging application 107 and the group messaging engine 103. In some embodiments, the user interfaces include user interface elements that allow users 125 to interact with the user device 115 and input information and commands, such as text entry fields, selection boxes, drop-down menus, buttons, virtual keyboards and numeric pads, etc. The message entry form may include an input field, such as a drop-down menu, for inputting the recipients of the message and a field for defining the body of the message. In selecting recipients, the user 125 can, for example, select from social circles of the user 125's social graph retrievable from the social graph 130. The user interface engine 308 generates this drop-down menu by querying the social graph 130 of the social network for all of the social circles defined by the user 125 of the user device 115 and populating the drop-down menu with the social circles. In some embodiments, a user 125 defines social circles for family, friends, acquaintances, work contacts, etc. from his or her contacts on the social network. Examples of user interfaces generated for display on the display 316 of the user device 115a by the user interface engine 308 are illustrated in FIGS. 7 and 8, and are further discussed in detail below.

The user settings module 310 is software including routines for storing, retrieving and sending user settings-related information. In some embodiments, the user settings module 310 is a set of instructions executable by the processor 335 to provide the functionality. In other embodiments, the user settings module 310 is stored in the memory 337 of the user device 115 and is accessible and executable by the processor 335 to provide the functionality. In any of these embodiments, the user settings module 310 may be adapted for cooperation and communication with the processor 335 and other components of the user device 115 via the bus 320.

In some embodiments, the user settings module 310 is coupled to the user interface engine 308 to receive input signals identified by the user interface engine 308 as user settings-related information. For example, to enter or modify the user 125's user settings, the User 125 selects user interface elements included in a user interface rendered by the user interface engine 308 using the input device 318. The user interface engine 308 identifies signals received from the input device 318 as usr setting-related information and sends the signals to the user settings module 310. The user settings module 310 modifies behavior of the group messaging application 107 based on the user setting-related information received, and stores the user setting-related information for later reference and modification. In some embodiments, the user setting module 310 is capable of storing and retrieving data describing the user settings in and from the messaging data store 214 of the social network server 101, the memory 337 of the user device 115, or both. In some embodiments, some of the user settings maintained by the user settings module 310 are applicable to the group messaging engine 103. For example, the user 125 can control functionality of the fallback determination module 204 of the group messaging engine 103 by modifying the settings presented in the fallback options interface 800 (see FIG. 8). Additional functionality and structure of the user settings module 310 is described below with reference to at least FIG. 8.

The persistence module 312 is software including routines for maintaining a persistent connection with the connection server 140 when the user device 115 is coupled to the network 105 via the network data connection. In some embodiments, the persistence module 312 is a set of instructions executable by the processor 335 to provide the functionality. In other embodiments, the persistence module 312 is stored in the memory 337 of the user device 115 and is accessible and executable by the processor 335 to provide the functionality. In any of these embodiments, the persistence module 312 may be adapted for cooperation and communication with the processor 335 and other components of the user device 115 via the bus 320.

The persistence module 312 is coupled to the communication unit 339 via the bus 320. In Some embodiments, the persistence module 312 receives a connectivity signal from the communication unit 339 indicating whether the communication unit 339 is coupled to the network 105 and/or the mobile network 106. If the connectivity signal indicates that the communication unit 339 is coupled to the network 105, either directly via signal line 114 or indirectly via signal line 118, as previously described, the persistence module 312 generates and sends a connection request to the connection server 140. The connection server 140 receives the request, identifies the user device 115 using identifying information provided in the request and maintains a persistent connection with the user device 115 if the user device 115 is properly identified by the connection server 140. In some embodiments, the identifying information provided in the request is a unique identifier associated with a user 125 of the user device 115 or the use device 115 itself. For example the identifying information includes one or more of a mobile network subscriber key, a media access control address (MAC address), an IP address of the user device 115, information identifying the group messaging application 107 and a version level thereof; a user identifier for the social network, etc.

Methods

Figure 4:
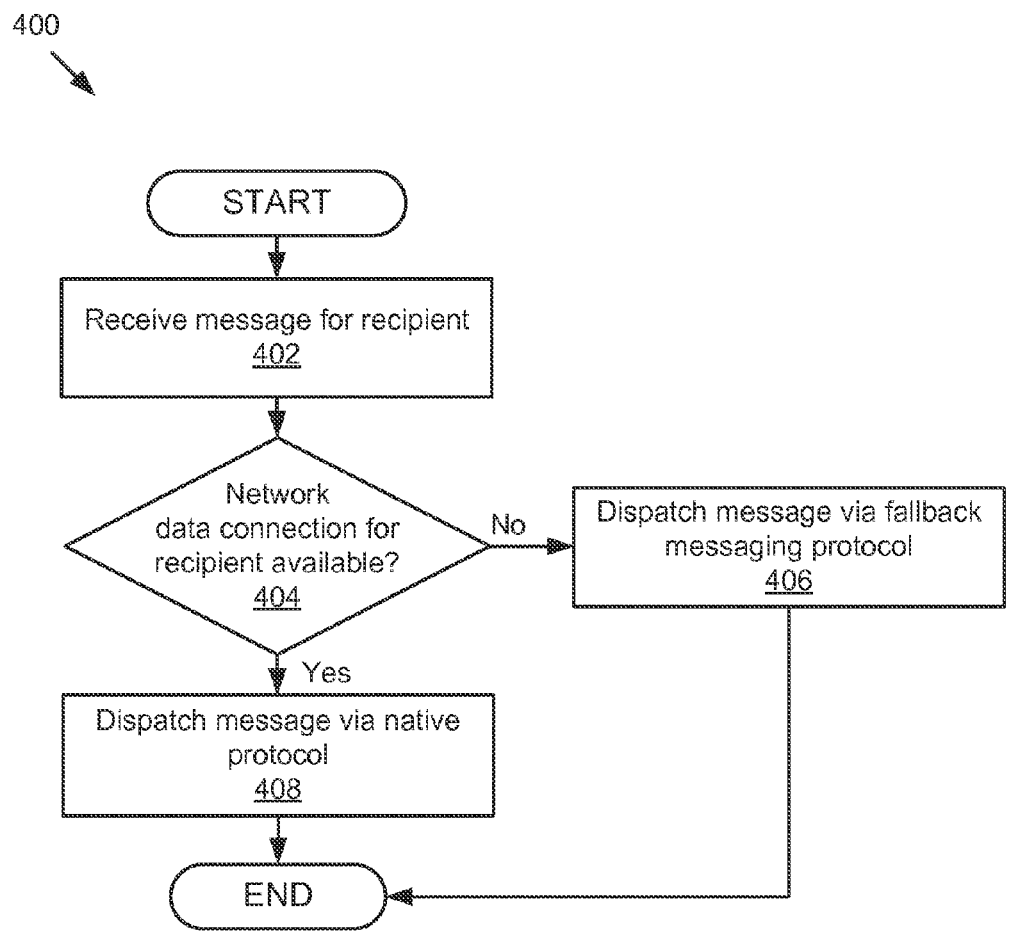
FIG. 4 is a flowchart of a method for fallback messaging according to some embodiments of the present disclosure.
Figure 5:
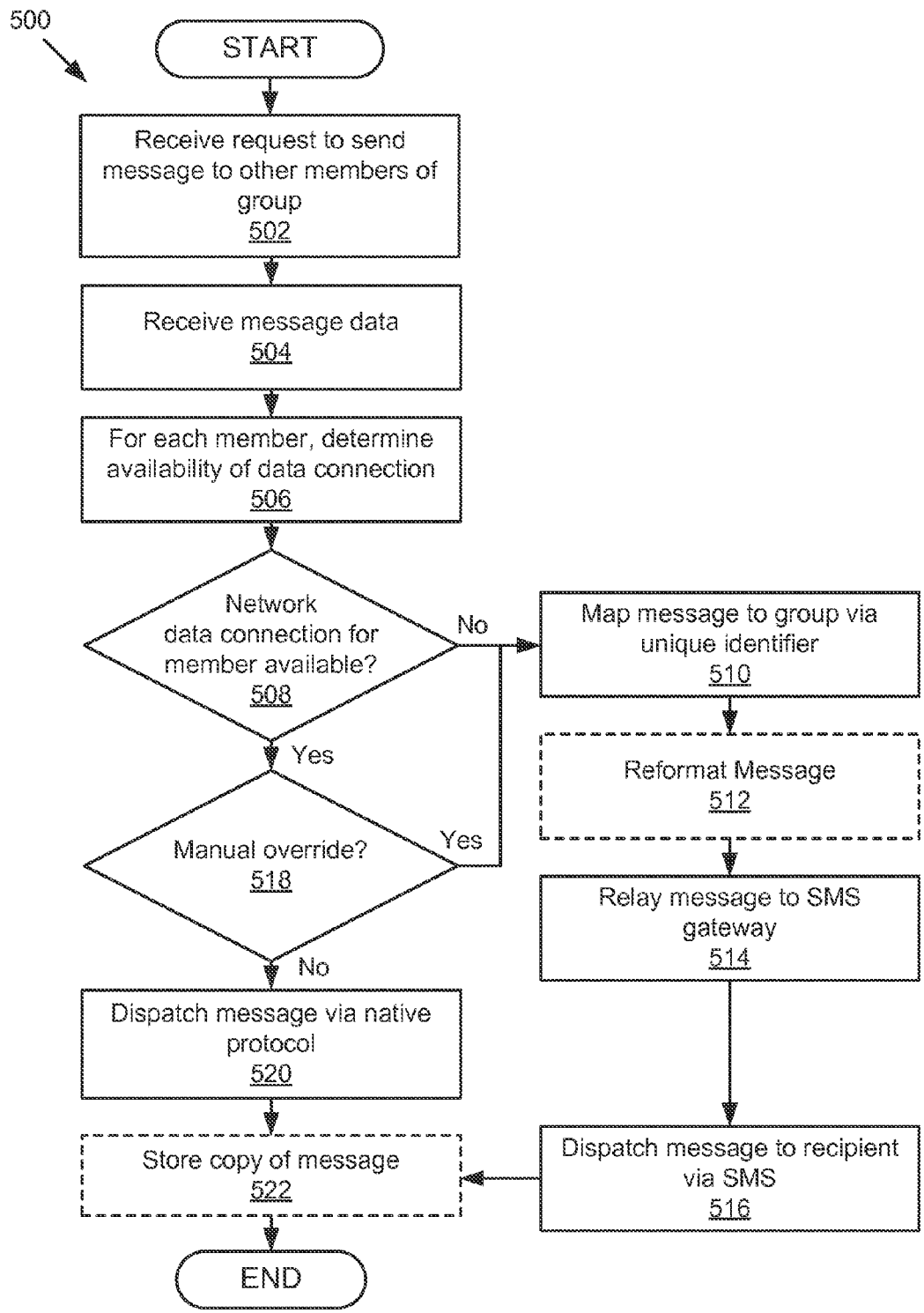
FIG. 5 is a flowchart of a method for fallback messaging according to some embodiments of the present disclosure.

Referring now to FIGS. 4-6, various embodiments of the methods of the present disclosure are described. FIG. 4 is a flowchart of a method 400 for fallback messaging according to some embodiments of the present disclosure. The method 400 begins by the interface module 202 receiving 402 message data from a user device 115 for one or more recipients. The method 400 continues by the fallback determination module 204, in cooperation with the connection server 140, determining 404 whether a user device 115 of each of the one or more recipients has a network data connection to the connection server 140. For each of the recipients determined 404 not to have a network data connection, the fallback determination module 204 instructs the dispatcher 208 to dispatch 406 the message data via a fallback data connection using a fallback messaging protocol. For each of the recipients determined 404 to have a network data connection, the fallback determination module 204 instructs the dispatcher 208 to dispatch 408 the message data via the network data connection using a protocol native to the group messaging engine 103. This method 400 is particularly advantageous because allows users 125 to continue to exchange messages via the fallback data connection even if the network data connection is unavailable (e.g., unusable, intermittent, unreliable disconnected, etc.).

FIG. 5 is a flowchart of a method fort fallback messaging according to some embodiments of the present disclosure. The method 500 begins by the interface module 202 receiving 502 a request from the user device 115 of a user 125 belonging to a messaging group to send a message to the other users (i.e., members) of the messaging group. The method 500 continues by the interface module 202 receiving 594 the message data describing the message. In some embodiments, the message data includes information identifying the user 125 who sent the message and the users 125 designated to receive the message. Next, the fallback determination module 204, in cooperation with the connection server 104, determines 506 whether a user device 115 of each user 125 designated to receive the message data has a network data connection. In some embodiments, the fallback determination module 204 determines whether the user device 115 of each of the designated recipients has a network data connection based on connection information received from the connection server 140. For example, a network data connection is determined by the fallback determination module 204 not to exist because the connection information provided by the connection server 140 describes the network data connection as being non-existent or unreliable, e.g., connectivity is intermittent, packet loss of data packets being transmitted via the network data connection is high, etc. For each of the designated recipients determined 508 by the fallback determination module 204 not to have a network data connection (i.e., the fallback recipients), the method 500 continues by the mapping module 206 mapping 510 the message data to the messaging group using a fallback identifier, mapping the message data to the messaging thread and messaging group using a unique session identifier, and providing mapping data including the fallback identifier and fallback information for the fallback recipients such as phone numbers. In some embodiments, the fallback identifier is a phone number drawn from a pool of phone numbers associated with the SMS gateway 150, and identifies the SMS gateway 150 as the sender of the message data when sent as an SMS message via the fallback data connection.

Next, the dispatcher 208 optionally instructs the conversion module 212 to reformat 512 the message data into a SMS-compatible format and then, based on the routing signal, the dispatcher 208 modifies the sender and recipients of message data to correspond with the mapping data included in the routing signal and relays 514 the message data to the SMS gateway 150. In other embodiments, the message data is not reformatted and the essential components of the message data are relayed 514 to the SMS gateway 150. The method 500 continues by the SMS gateway 150 receiving the message data from the dispatcher 208, and if the message data has not been formatted into an SMS-compatible format by the conversion module 212, the SMS gateway 150 formats the message data. The SMS gateway then dispatches 516 the message data to a user device 115 of each of the fallback recipients via the fallback data connection using SMS protocol. Next, the dispatcher 208 optionally stores 522 a copy of the message data in the messaging data store 214 of the group messaging engine 103, and the method 500 is then complete and ends.

Referring back to step 508, for each of the users of the messaging group determined 508 to have a network data connection, the method continues by the user settings module 210 verifying 518 whether a user-configurable override setting (e.g., see FIG. 8, 808) instructing the group messaging engine 103 to dispatch all message data for that particular user via the fallback data connection regardless of the status of the network data connection. If the override setting is set to override, the method 500 completes the steps 510, 512, 514, 516 and optionally 522 as described above, and then ends. If the manual override setting is not set to override, the method 500 continues by the dispatcher 208 dispatching 520 the message data via the network data connection using a protocol native to the group messaging engine 103 based on the muting instruction generated by and received from the fallback determination module 204. In other embodiments, a user can disable receiving SMS messages via the fallback data connection by setting a user setting (e.g., see FIG. 8, 806) instructing the method 500 to story the message data in the messaging data store 214 and wait until the user device 115 establishes a network data connection to the connection server 140 to dispatch it. For example, should a user wish to avoid SMS messaging charges from being assessed by the operator of the mobile network, a user can disable messages from being delivered as SMS messages via the fallback data connection by enabling this setting. The method 500 continues by the dispatcher 208 optionally storing 522 a copy of the message data in the messaging data store 214 of the group messaging engine 103, and then the method 500 is complete and ends.

Figure 6A:
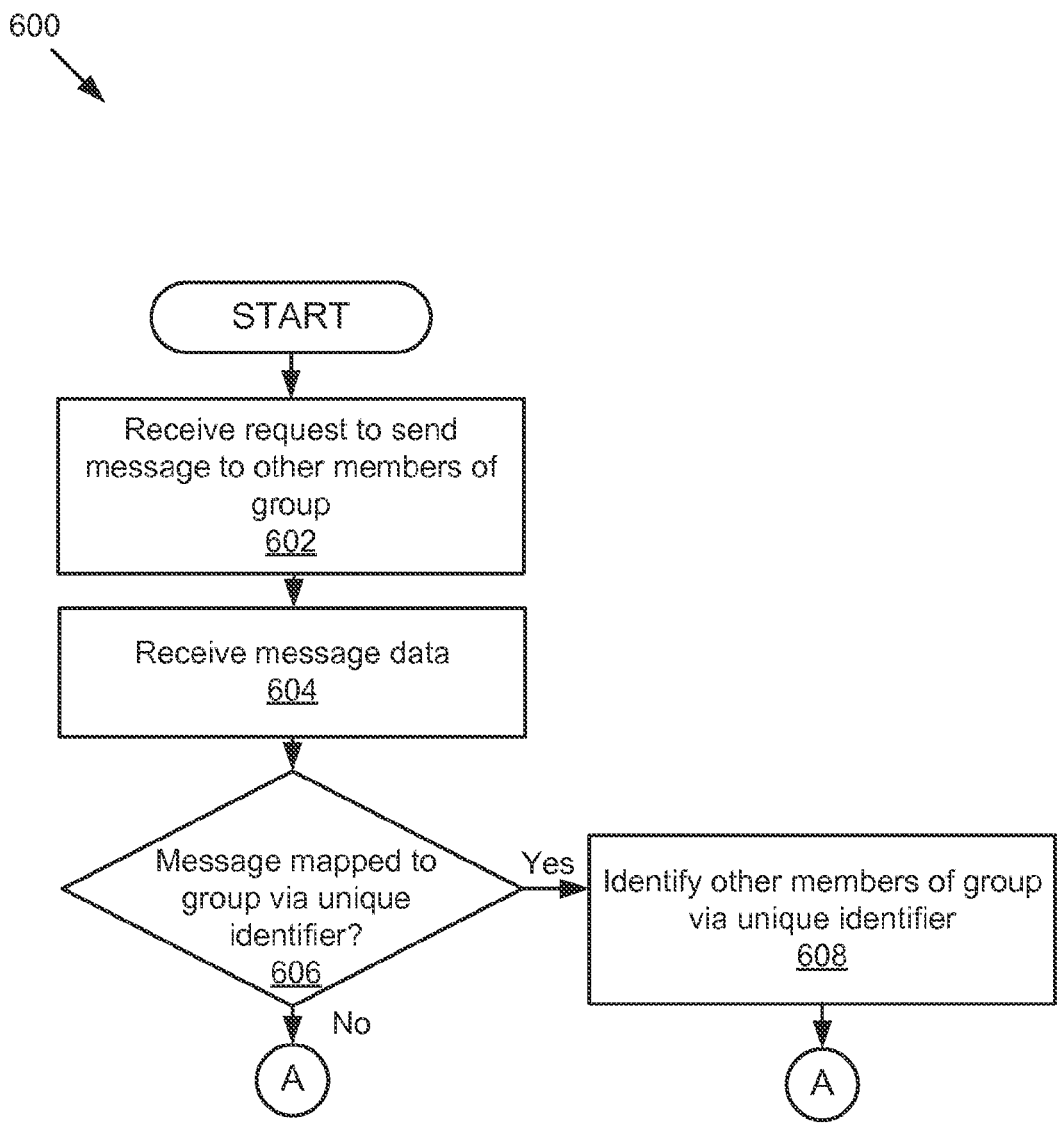
FIGS. 6A and 6B are flowcharts of a method for fall back messaging according to some embodiments of the present disclosure.
Figure 6B:
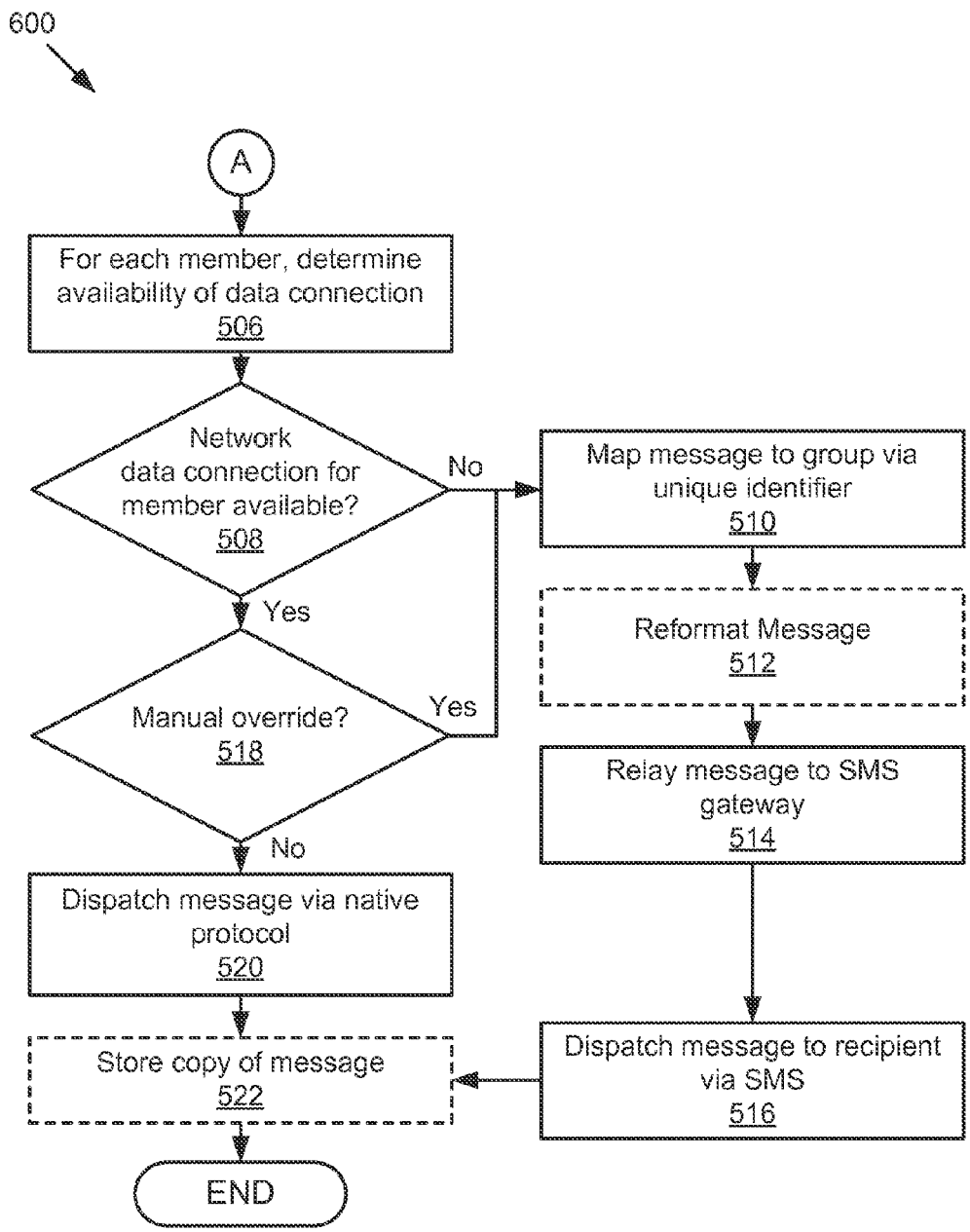

FIGS. 6A and 6B are flowcharts of a method for fallback messaging according to some embodiments of the present disclosure. The method 600 begins by the interface module 202 receiving 602 a request from a user device 115 of a user 125 belonging to a messaging group to send a message to the other users (i.e., members) of the messaging group. In some embodiments, the request is received 602 via the fallback data connection using the fallback messaging protocol. In other embodiments the request is received 602 via the network data connection using a protocol native to the group messaging engine 103. The method 600 continues by the interface module 202 receiving 604 the message data.

The method 600 continues by the mapping module 206 determining 606 if sender information included in the message data includes a fallback identifier that is mapped to a particular group of users. In some embodiments, inclusion of a fallback identifier in the sender information indicates that the message data received in step 604 was sent from a user device 115 in response to previously receiving a message from the group messaging engine 103 via the fallback data connection during a previous iteration of the method 600. As described above with reference to step 510, in some embodiments, the fallback identifier is a phone number identifying the SMS gateway 150 as the sender of the previous message. The mapping module 206 uses this phone number to identify 208 the other members of the messaging group (i.e., the sender and the other recipients of the previous message). Then, the mapping module 206 provides this information to the fallback determination module 204 for use when determining 508 the reliability of the network data connection of each of the group members designated to receive the message data, as described above. After step 606 or after step 608, as the case may be, the method 600 continues by completing steps 506 to 522, as described above with reference to FIG. 5 and then ends. As illustrated in FIGS. 6A and 6B, the method 600 includes many steps similar to those described above for the method 500. For convenience and ease of understanding; those steps have the same reference numerals and perform the same or similar functionality, and their description will not be repeated here.

The method 600 is particularly advantageous because it allows for any reply messages seat via the fallback data connection to be routed back to the SMS gateway 150 and ultimately the group messaging engine 130, and allows for the reply messages to be mapped back to the members of the messaging group by the mapping module 206. The method 600 also provides the advantage of a more seamless messaging experience for the members of the messaging group because all members of the group can continue to receive the message data being exchanged, either via the network data connection or the fallback data connection, and the messages being exchanged can continue to be associated with a common messaging thread even though some of the messages may have been sent using the fallback data connection and massaging protocol. Additionally, while the above-described methods 400, 500 and 600 and advantages are described within the context of SMS messaging, these methods 400, 500 and 600 and benefits are also applicable to the other fallback messaging protocols discussed above, such as MMS, XMS, email, IM etc.

User Interfaces

FIGS. 7 and 8 are graphic representations of embodiments of user interfaces for fallback messaging according to some embodiments of the present disclosure. In particular, FIG. 7 is a graphic representation of a user interface 700 for viewing a message thread according to some embodiments. The user interface 700 generated by the user interface engine 308 includes a window 702 having a number of components including a toolbar buttons 704 and 706, horizontal scroll region 708, message fields 710, 712, 714 and 716, and text entry field 718. The window 702 is a container for the other elements of the user interface 700. The toolbar button 704 is a button for adding another user 125 to the messaging group. In some embodiments, selecting this button activates a dialog which allows a user 125 to add additional users 125 to the messaging group from a database of contacts stored on the user device 115 or from contacts and/or social circles stored in and retrievable from the social graph 130. In some embodiments, phone contacts that do not have user accounts for the social network software/application 102 and are only addressable via a mobile phone number can be added to the messaging group and the group messaging engine 105 will exchange messages between those phone contacts and the other members of the messaging group via a text messaging protocol, such as SMS. The toolbar button 706 is a button for modifying messaging settings 706. In some embodiments, selecting the button 706 activates the user interface 800 depicted in FIG. 8. User interface 800 is discussed in further detail below. The horizontal scroll region 708 is a horizontally scrollable field for viewing thumbnails of members of the messaging group associated with the messaging thread. In some embodiments, selecting an icon depicting a member displays an interface showing that member's social stream or profile on the social network. In other embodiments, selecting the icon depicting the member shows all messaging threads that involve or reference that member.

In some embodiments, message fields 710, 712, 714 and 716 each reflect a message of the messaging thread. Rows 710 and 712 depict messages exchanged using the network data connection via the protocol native to group messaging application 107 and group messaging engine 103. In the depicted embodiment, Rows 714 and 716 illustrate messages exchanged via SMS (i.e., the fallback messaging protocol) using the fallback data connection, and are labeled with "SMS." Text entry field 718 is a field for inputting the text of the message to be seat to the other members of the messaging group depicted in the horizontal scroll region 708. In some embodiment, upon selecting the text entry field 718 to enter message text, the user interface engine 308 renders a virtual keyboard including a send button for display on the display 316 underneath the text entry field 718. To send a message, the user 125 enters message text in the text entry field 718 and selects the send button to send the message data to the other members of them messaging group (i.e., the designated recipients). In other embodiment, the user 125 inputs and sends the message text using a hardware keyboard included in the user device 115. In some embodiments, message text is entered in reply to a previous message displayed in one of message fields 710, 712, 714 and 716. In other embodiments, message text is entered to discuss a new topic with the other members of the message thread. In some embodiments where the user device 115 is not coupled to the network 105 via the network data connection, once a user 125 enters and selects to send the message text, the messaging module 306 receives the data describing message from the input device 318 and provides it to the routing module 304, and the routing module 304 relays the message text to the SMS Module 302 of the user device 115 for dispatch to the SMS gateway 150, which is addressable on the mobile network 106 using a fallback identifier included in a previous message received from the group messaging engine 103 (e.g., included with message data of field 714). If no fallback identifier is available for sending the message data to the SMS gateway 150, the group messaging application 107 can send the message data directly to each of the members of the messaging group via SMS by retrieving mobile phone numbers for each of the members from a contact database stored in the memory 337 of the user device 115, and addressing the message data to the phone numbers of the users instead of their group messaging engine user identifiers (e.g., social network software/application 102 user identifiers). Additionally, for any subsequent messages sent by that user 125, the group messaging application 107 can revert back to sending the messages via the network data connection using the native group messaging engine protocol, provided the network data connection is available.

FIG. 8, is a graphic representation of a user interface 800 for managing user settings according to some embodiments. The user interface 800 generated by the user interface engine 308 includes a window 802, a toolbar 804 and user setting toggles 806 and 808. The window 802 is a container for the other elements of the user interface 800. The toolbar 804 includes a label describing the user interface 800 and a return button for returning back to a previous user interface from which the user interface 800 was activated, such as the user interface 700. The toggle 806 is a user-selectable switch that toggles the fallback functionality described herein on or off. For example, if a user 125 does not want to receive or send messages via the fallback data connection when a network data connection is not available, the user 125 can switch this functionality off by selecting edit and "off" (not shown). Toggle 808 is a user-selectable switch for sending all messages exchanged using the group messaging engine 103 as SMS messages via the fallback data connection, regardless of whether a network data connection is available. In some embodiments, switching the toggle 808 to an on position automatically switches toggle 806 to the on position if it is in the off position at that time. While toggles 806 and 808 are described in relation to SMS, these toggles are applicable to any of the fallback messaging protocols described herein. Additionally, while only two settings are shown as being included in the user interface 800, settings controlling any aspect of the group messaging application 107 or group messaging server 103 may be included and are within the scope of the present disclosure. It should also be understood that the user interfaces 700 and 800 are merely examples and that interface elements may have a variety of distinct formats, positions within the window, and combinations, all of which are encompassed by the scope of the present disclosure.

A system and methods or fallback messaging have been described. In the above description, for purposes of explanation, numerous specific details are set forth in order to provide a thorough understanding of the disclosure. It should be understood that the technology described in the various example embodiments can be practiced without these specific details. In other instances, structures and devices were shown in block diagram form in order to avoid obscuring the disclosure. For example, the present disclosure was described in some embodiments above with reference to user interfaces and particular hardware. However, the present disclosure applies to any type of computing device that can receive data and commands, and any devices providing services. Moreover, the present disclosure was described above primarily in the context of exchanging messages via a social network server 101. However, it should be understood that the present disclosure applies to any type of other message exchange between endpoints.

Reference in the specification to "one embodiment" or "an embodiment" means that a particular feature, structure or characteristic described in connection with the embodiment is included in at least one embodiment of the disclosure. The appearances of the phrase "in one embodiment" in various places in the specification are not necessarily all referring to the same embodiment.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, slash memories including USB keys with non-volatile memory or any type of media suitable for storing electronic instructions, each coupled to a computer system bus.

The disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

A data processing system suitable for storing and/or executing program code will include at least one processor coupled directly or indirectly to memory elements through a system bus. The memory elements can include local memory employed during actual execution of the program code, bulk storage and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the present disclosure is not described with reference to any particular programming language. It will be appreciated that a variety of programming languages may be used to implement the teachings of the disclosure as described herein.

It is intended that the scope of the disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, it should be understood that the modules, routines, features, attributes, methodologies and other aspects of the disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way. Additionally, the disclosure is in no way limited to implementation in any specific programming language, or for any specific operating system or environment. Accordingly, the disclosure is intended to be illustrative, but not limiting, of the scope of the present disclosure, which is set forth in the following claim.

What is claimed is:

1. A method comprising:
receiving, at a computing device, first message data associated with (i) a messaging group exchanging messages and (ii) an active messaging thread, the messaging thread having a corresponding unique session identifier;
for a first one or more user devices of the messaging group:
sending, by the computing device, using a first messaging protocol, the first message data along with the unique session identifier corresponding to the messaging thread; and
for a second one or more of the user devices of the messaging group:
assigning, by the computing device, a fallback identifier of each of the one or more second user devices to the messaging thread; and
sending, by the computing device, using a second messaging protocol, the first message data along with the unique session identifier corresponding to the messaging thread.

2. The method of claim 1, further comprising:
receiving, at the computing device, a message via the first messaging protocol; and
responsive to detecting the unique session identifier in the received message, adding, by the computing device, data of the received message to the messaging thread.

3. The method of claim 1, further comprising:
receiving, at the computing device, a message via the first messaging protocol; and
responsive to detecting the unique session identifier in the received message, sending, by the computing device, data of the received message to one or more user devices of the messaging group.

4. The method of claim 1, further comprising:
receiving, at the computing device, a message via a fallback messaging protocol;
associating, by the computing device, the received message with the messaging thread in response to mapping a fallback identifier of the received message to the messaging thread; and
adding, by the computing device, data of the received message to the messaging thread.

5. The method of claim 1, further comprising:
receiving, at the computing device, a message via a fallback messaging protocol;
associating, by the computing device, the received message with the messaging thread in response to mapping a fallback identifier of the received message to the messaging thread; and
sending, by the computing device, data of the received message to one or more user devices of the messaging group.

6. The method of claim 1, wherein the second messaging protocol is one of a text messaging protocol, an email protocol, and an instant messaging protocol.

7. The method of claim 6, wherein the sending messaging protocol is short message service (SMS).

8. The method of claim 1, wherein the first messaging protocol is a native messaging protocol and the second messaging protocol is a fallback messaging protocol.

9. A non-transitory computer readable medium including a computer readable program that, when executed on a computer, causes the computer to:
receive first message data associated with (i) a messaging group exchanging messages and (ii) an active messaging thread, the messaging thread having a corresponding unique session identifier;
for a first one or more user devices of the messaging group:
send, using a first messaging protocol, the first message data along with the unique session identifier corresponding to the messaging thread; and
for a second one or more of the user devices of the messaging group:
assign a fallback identifier of each of the one or more second user devices with the messaging thread; and
send, using a second messaging protocol, the first message data along with the unique session identifier corresponding to the messaging thread.

10. The non-transitory computer readable medium of claim 9, wherein the computer readable program, when executed on the computer, further causes the computer to:
receive a message via the first messaging protocol; and
responsive to detecting the unique session identifier in the received message, add data of the received message to the messaging thread.

11. The non-transitory computer readable medium of claim 9, wherein the computer readable program, when executed on the computer, further causes the computer to:
receive a message via the first messaging protocol; and
responsive to detecting the unique session identifier in the received message, send data of the received message to one or more user devices of the messaging group.

12. non-transitory computer readable medium of claim 9, wherein the computer readable program, when executed on the computer, further causes the computer to:
receive a message via a fallback messaging protocol;
associate the received message with the messaging thread in response to mapping a fallback identifier of the received message to the messaging thread; and
add data of the received message to the messaging thread.

13. The non-transitory computer readable medium of claim 9, wherein the computer readable program, when executed on the computer, further causes the computer to:
receive a message via a fallback messaging protocol;
associate the received message with the messaging thread in response to mapping a fallback identifier of the received message to the messaging thread; and
send data of the received message to one or more user devices of the messaging group.

14. The non-transitory computer readable medium of claim 9, wherein the second messaging protocol is short message service (SMS).

15. The non-transitory computer readable medium of claim 9, wherein the first messaging protocol is a native messaging protocol and the second messaging protocol is a fallback messaging protocol.

16. A system, comprising:
a server configured to:
receive first message data associated with (i) a messaging group exchanging messages and (ii) an active messaging thread, the messaging thread having a corresponding unique session identifier;
for a first one or more user devices of the messaging group:
send, using a first messaging protocol, the first message data along with the unique session identifier corresponding to the messaging thread; and
for a second one or more of the user devices of the messaging group:
assign a fallback identifier of each of the one or more second user devices to the messaging thread; and
send, using a second messaging protocol, the first message data along with the unique session identifier corresponding to the messaging thread.

17. The system of claim 16, wherein the server is further configured to:
receive a message via the first messaging protocol; and
responsive to detecting the unique session identifier in the received message, add data of the received message to the messaging thread.

18. The system of claim 16, wherein the server is further configured to
receive a message via the first messaging protocol; and
responsive to detecting the unique session identifier in the received message, send data of the received message to one or more user devices of the messaging group.

19. The system of claim 16, wherein the server is further configured to
receive a message via a fallback messaging protocol;
associate the received message with the messaging thread in response to mapping a fallback identifier of the received message to the messaging thread; and
add data of the received message to the messaging thread.

20. The system of claim 16, wherein the server is further configured to
- receive a message via a fallback messaging protocol;
- associate the received message with the messaging thread in response to mapping a fallback identifier of the received message to the messaging thread; and
- send data of the received message to one or more user devices of the messaging group.

21. The system of claim 16, wherein the second messaging protocol is one of a text messaging protocol, an email protocol, and an instant messaging protocol.

22. The system of claim 21, wherein the second messaging protocol is short message service (SMS).

23. The system of claim 16, wherein the first messaging protocol is a native messaging protocol and the second messaging protocol is a fallback messaging protocol.

* * * * *